US011400367B1

(12) United States Patent
Ichapurapu et al.

(10) Patent No.: US 11,400,367 B1
(45) Date of Patent: Aug. 2, 2022

(54) ELECTRONIC DEVICE FOR NETWORK APPLICATIONS

(71) Applicant: Amazon Technologies, Inc., Seattle, WA (US)

(72) Inventors: Ravi Ichapurapu, Morgan Hill, CA (US); Sameet Ramakrishnan, Saratoga, CA (US); Evan Fletcher Dougal, Mountain View, CA (US)

(73) Assignee: Amazon Technologies, Inc., Seattle, WA (US)

( * ) Notice: Subject to any disclaimer, the term of this patent is extended or adjusted under 35 U.S.C. 154(b) by 318 days.

(21) Appl. No.: 16/450,546

(22) Filed: Jun. 24, 2019

(51) Int. Cl.
*A63F 9/24* (2006.01)
*A63F 13/00* (2014.01)
*G06F 17/00* (2019.01)
*A63F 13/355* (2014.01)
*H04W 76/15* (2018.01)
*H04B 17/309* (2015.01)
*H04L 43/08* (2022.01)

(52) U.S. Cl.
CPC ......... *A63F 13/355* (2014.09); *H04B 17/309* (2015.01); *H04L 43/08* (2013.01); *H04W 76/15* (2018.02)

(58) Field of Classification Search
CPC ...... A63F 13/35; A63F 13/355; A63F 13/358; A63F 2300/204; A63F 2300/207; A63F 2300/407; A63F 2300/534; A63F 2300/6063
See application file for complete search history.

(56) References Cited

U.S. PATENT DOCUMENTS

2015/0296247 A1 * 10/2015 Glasser .............. H04N 21/6587 725/74
2017/0142201 A1 * 5/2017 Holmes ................. A63F 13/215

* cited by examiner

*Primary Examiner* — Milap Shah
*Assistant Examiner* — Jason Pinheiro
(74) *Attorney, Agent, or Firm* — Lee & Hayes, P.C.

(57) ABSTRACT

This disclosure describes, in part, an electronic device for executing network applications. For instance, the electronic device may establish a connection with a network device. The electronic device may then receive input data from a control device. Using the connection, the electronic device may send the input data to a remote system, which uses the input data to update a state of an application. The electronic device then receives, using the connection and from the remote system, audio data and video data representing the state of the application. In some instances, the electronic device may further receive, using the connection and from the remote system, first timestamp data for outputting the audio data and second timestamp data for displaying the video data. The electronic device may then send the audio data to a control device and the video data to a display device.

20 Claims, 13 Drawing Sheets

ELECTRONIC DEVICE FOR NETWORK APPLICATIONS

BACKGROUND

As gaming has become popular, companies have created electronic devices, such as video game consoles, that allow users to play various types of games. For example, a video game console, connected to a television, may cause the television to display content related to a state of a game. While the television is displaying the content, the video game console may receive inputs directly from a video game controller in possession of a user. The video game console may then process the inputs in order to update the state of the game. Based at least in part on the updates, the video game console may cause the television to display content related to the updated state of the game. If the user is playing a multiplayer online game, then the video game console may further send data representing the updated state of the game to a remote server.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
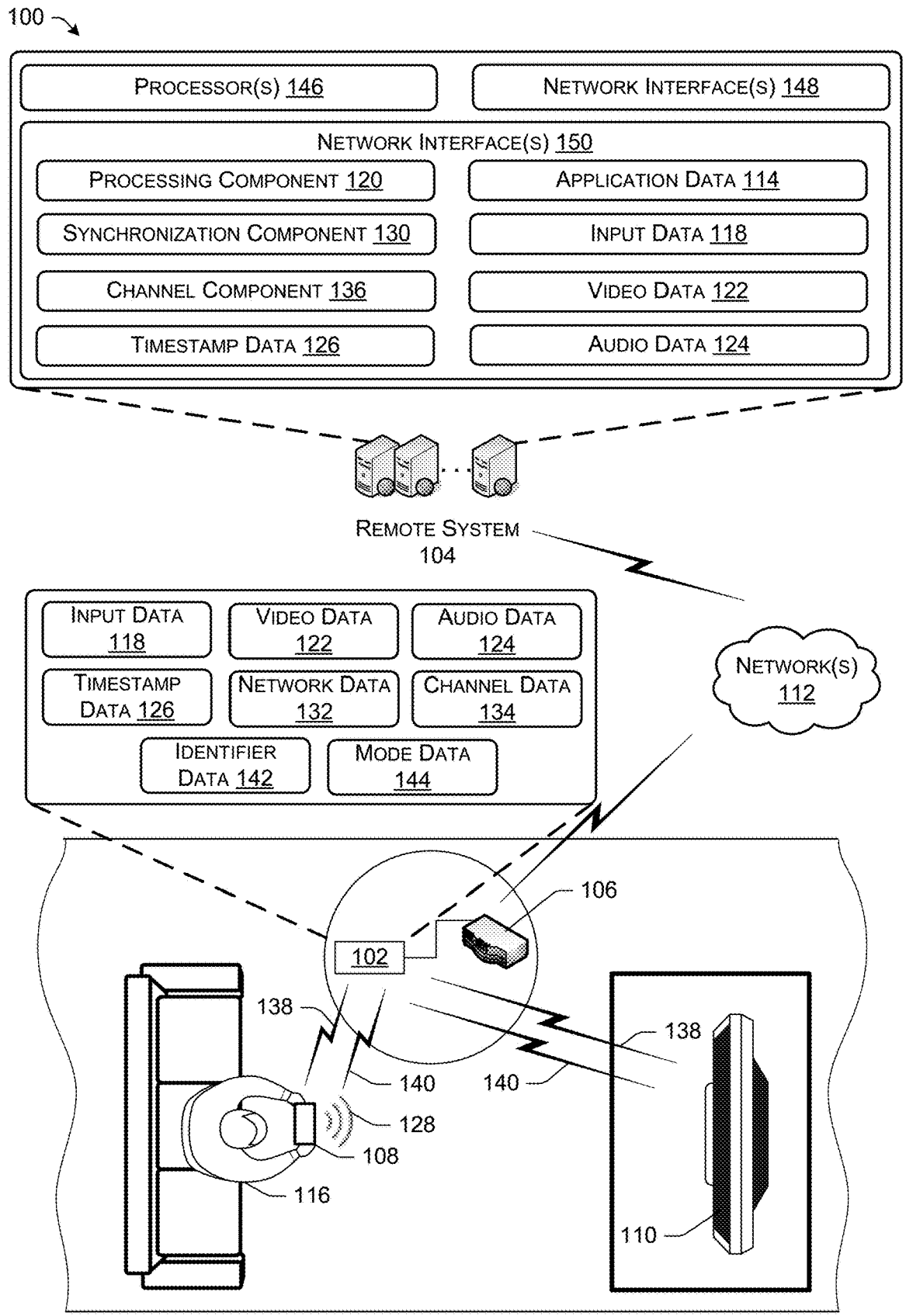
FIG. 1 illustrates a schematic diagram of an example system using an electronic device for network applications, according to various examples of the present disclosure.

This disclosure describes, in part, an electronic device for controlling network applications. For instance, a user may control an application executing on a remote system using a control device that communicates with the remote system via the electronic device. The electronic device may include, but is not limited to, a dongle, a tablet, a mobile phone, a laptop, a voice-activated device, and/or any other type of device. To communicate with the remote system, the electronic device may include a network connection with a network device, such as an access point. In some instances, the network connection may include a wired connection, such as an Ethernet connection, a cable connection, and/or any other type of wired connection. Additionally, or alternatively, in some instances, the network connection may include a wireless connection.

To control the application, the electronic device may receive input data from the control device, where the input data represents at least inputs received by the control device from the user. The electronic device may then send the input data to the remote system. Using the input data, the remote system may update a current state of the application. After updating the current state of the application, electronic device may receive, from the remote system, video data and/or audio data representing the current state of the application. The electronic device may then send the audio data to the control device. Using the audio data, the control device may cause sound represented by the audio data to be output to the user. Additionally, the electronic device may send at least the video data to the display device. Using the video data, the display device may display content (e.g., image(s)) represented by the video data. The system of devices (e.g., the electronic device, the remote system, the control device, and/or the display device) may then continue to perform these processes in order to continuously to update the state of the application.

In some instances, the electronic device may send and/or receive low-latency transmissions with the remote system, the control device, and/or the display device. For instance, the electronic device may send the transmissions to and/or receive the transmissions from the control device at given time intervals. A given time interval may include, but is not limited to, five milliseconds, eight milliseconds, ten milliseconds, one hundred milliseconds, and/or the like. In some instances, the electronic device may need to send and/or receive the low-latency transmissions in order for the system of devices to quickly update the state of the application for the user. This is because the remote system, which may be located remotely from each of the electronic device, the control device, and the display device, is performing the updates to the state of the application and then sending the data representing the updates back to the electronic device.

For an example of sending and receiving low-latency transmissions, the electronic device may receive, from the control device, data packets at the expiration of the given time intervals. A data packet may include at least the input data representing the inputs received by the control device during a given time interval. The electronic device may then send the data from the data packets (and/or the data packets) to the remote system. After the remote system updates the state of the application, the electronic device may receive, from the remote system, data packets that include the data representing the state of the application. For instance, the data packets may include at least the audio data and the video data representing the state of the application. The electronic device may then send the audio data from the data packets to the control device and send the video data from the data packets to the display device.

In some instances, the electronic device may perform one or more techniques to synchronize the sound being output by the control device with the content being displayed by the display device. For instance, when updating the state of the application, the remote system may generate first timestamp data representing a first timestamp associated with the audio data being sent to the control device and/or second timestamp data representing a second timestamp associated with the video data being sent to the display device. The electronic device may then receive the first timestamp data and second timestamp data from the remote system. In some instances, the electronic device receives a data packet that includes at least the video data, the audio data, the first timestamp data, and the second timestamp data. In some instances, the electronic device separately receives, from the remote system, the video data, the audio data, the first timestamp data, and/or the second timestamp data. Still, in some instances, the electronic device receives, from the remote system, a first data packet that the includes the audio data and the first timestamp data and a second data packet that includes the video data and the second timestamp data.

The electronic device may then use the first timestamp data and the second timestamp data to synchronize the outputting of the sound with the displaying of the content. For a first example, the electronic device may send, to the control device, the audio data and the first timestamp data (e.g., from the data packet). The first timestamp data may include a first instruction to output the sound at a first time represented by the first timestamp. Additionally, the electronic device may send, to the display device, the video data and the second timestamp data (e.g., from the data packet). The second timestamp data may include a second instruction to display the content at a second time represented by the second timestamp. In some instances, the first time is the same as the second time. In other instances, the first time is within a threshold period of time to the second time. As described herein, a threshold period of time may include, but is not limited to, one millisecond, five milliseconds, ten milliseconds, one hundred milliseconds, and/or another time period.

For a second example, the electronic device may use the first timestamp data to determine when to send the audio data to the control device and/or use the second timestamp data to determine when to send the video data to the display device. For instance, the electronic device may determine that a current time includes the first time represented by the first timestamp data and/or that the current time is within a threshold period of time to the first time. Based at least in part on the determination, the electronic device may send, to the control device, the audio data for output by the control device. Additionally, the electronic device may determine that the current time includes the second time represented by the second timestamp data and/or that the current time is within a threshold period of time to the second time. Based at least in part on the determination, the electronic device may send, to the display device, the video data for output by the display device.

In some instances, to synchronize the sound being output by the control device with the content being displayed by the display device, the electronic device may prioritize the audio data and/or the video data. For a first example, the electronic device may use the second timestamp data to determine that image frame(s) represented by the video data are about to expire. In some instances, the electronic device may make the determination based at least in part on the second time(s) associated with the image frame(s) being within a threshold period of time to the current time. The electronic device may further use the first timestamp data to determine that sound represented by the audio data is not about to expire. In some instances, the electronic device may make the determination based at least in part on the first time(s) associated with the sound being outside of the threshold period of time to the current time. Based at least in part on the determinations, the electronic device may prioritize the video data over the audio data. As such, the electronic device may send the video data to the display device before sending the audio data to the control device. In some instances, the electronic device may perform similar processes to prioritize the audio data over the video data.

For a second example, the electronic device may use the first timestamp data to determine that sound represented by the audio data is about to expire and use the second timestamp data to determine that image frame(s) represented by the video data are about to expire. Based at least in part on the determinations, the electronic device may prioritize the video data over the audio data. This may be because the content being displayed by the display device is more important for updating the state of the application for the user than the audio being output by the control device. As such, and using the prioritization, the electronic device may send the video data to the display device. Additionally, after sending the video data, the electronic device may (1) send the audio data to the control device (e.g., if the audio data has yet to expire), (2) delete the audio data, and/or (3) refrain from sending the audio data. In some instances, the electronic device may perform similar processes, but prioritize the audio data over the video data (e.g., such as when the audio data is more important for updating the state of the application for the user).

While the examples above describe prioritizing audio data and video data, in other instances, the electronic device may prioritize other types of data. The other types of data may include, but are not limited to, logging data, . . . .

In some instances, to synchronize the sound being output by the control device with the content being displayed by the display device, the electronic device may select communication channel(s) for sending and/or receiving the data. For instance, the electronic device may scan multiple communication channels in order to determine respective metrics for each communication channel. The metrics for a communication channel may include, but are not limited to, a number of devices using the communication channel, an amount of congestion associated with the communication channel, a packet error rate (PER), a received signal strength indication (RSSI), a bit rate error, a wireless channel availability, a number of consecutive packet losses, a packet outage duration, packet arrival time, a type of data (e.g., video data, audio data, etc.) being communicated using the communication channel, a respective type of data being communicated by each device using the communication channel, and/or the like.

Additionally, or alternatively, in some instances, the electronic device may scan multiple communication channels in order to determine cumulative metrics for more than one communication channel. The cumulative metrics may include, but are not limited to, a number of devices using a network device, a number of devices using multiple network devices, types of data being communicated using a network device, types of data being communicated using multiple communication devices, and/or the like.

The electronic device (and/or the remote system) may then use the metrics to select at least one communication channel. In some instances, the electronic device selects the communication channel that includes the least amount of congestion. The electronic device may then send, to the control device and/or the display device, data indicating the communication channel. After sending the data, the electronic device may establish network connections with the control device and/or the display device using the communication channel.

In some instances, when sending the data indicating the communication channel, the electronic device may send the data using a network that is different from the network the electronic device uses to send the audio data and the video data. For instance, the communication channel may be associated with a first type of network. The first type of network may include, but is not limited to, the Internet, a local intranet, a Personal Area Network (PAN), a Local Area Network (LAN), a Wide Area Network (WAN), and/or the like. Additionally, the electronic device may use a second type of network to send other data (e.g., data other the audio data, the video data, and/or the timestamp data) to the control device and/or the display device. The second type of network may include, but is not limited to, Bluetooth, ZigBee, Z-Wave, a low-power wide-area network (LP-WAN), and/or the like. In some instances, it may take more power sending and/or receiving data over the first type of network than sending and/or receiving data over the second type of network.

In some instances, the electronic device may further send, to the control device and/or the display device, identifier data representing an identifier for communicating with the electronic device. As described herein, an identifier may include, but is not limited to, a service set identifier (SSID), an Internet Protocol (IP) address, a media access control (MAC) address, a numerical identifier, an alphabetic identifier, a mixed numerical and alphabetic identifier, and/or any other type of identifier. In some instances, the electronic device sends the identifier data using the first type of network. Additionally, or alternatively, in some instances, the electronic device sends the identifier data using the second type of network. Still, in some instances, the electronic device updates the identifier and then sends new identifier data when an event occurs. The event may include, but is not limited to, the elapse of a period of time, the electronic device detecting an unauthorized device (e.g., a device other than the control device and the display device) using the identifier, input received from the user, and/or the like.

In some instances, to synchronize the sound being output by the control device with the content being displayed by the display device, the electronic device may determine how to partition the bandwidth that is available via the communication channel. For a first example, the electronic device may determine to use a first percentage (e.g., 10%, 20%, 30%, etc.) of the bandwidth to send the audio data and determine to use a second percentage (e.g., 70%, 80%, 90%,) of the bandwidth to send the video data. For a second example, the electronic device may determine to use a first percentage (e.g., 10%, 20%, 30%, etc.) of the bandwidth to communicate with the control device and determine to use a second percentage (e.g., 70%, 80%, 90%,) of the bandwidth to communicate with the display device. In such instances, the electronic device may make the determinations based at least in part on the data being communicated between the devices.

For instance, the electronic device may determine that the electronic device is sending and receiving a first amount of data with the control device. The electronic device may further determine that the electronic device is sending and receiving a second amount of data with the display device. Using the first amount of data and the second amount of data, the electronic device may partition the bandwidth that is available via the communication channel. For example, the electronic device may determine a total amount of data using the first amount of data and the second amount of data (e.g., adding the first amount of data and the second amount of data). The electronic device may then determine the first percentage based at least in part on a first portion of the total amount of data that is caused by the control device (e.g., the total amount of data divided by the first amount of data). Additionally, the electronic device may determine the second percentage based at least in part on a second portion of the total amount of data that is caused by the display device (e.g., the total amount of data divided by the second amount of data). While this is just one example of using the total amount of data to partition the bandwidth, in other examples, the electronic device may use one or more other techniques. In some instances, the electronic device may continue to determine new first percentages and/or new second percentages as the electronic device continues to send and receive data with the control device and the display device. For example, the electronic device may determine a new first percentage and/or a new second percentage continuously, every second, five seconds, ten seconds, and/or the like.

Additionally to, or alternatively from, partitioning the bandwidth, in some instances, the electronic device may determine first time(s) for sending the audio data to the control device and second time(s) for sending the video data to the display device. For instance, and as discussed above, the electronic device may be sending data to and/or receiving data from the control device at given time intervals. As such, the electronic device may determine to send the audio data to the control device during a first portion of a given time interval and determine to send the video data to the display device during a second portion of the given time interval. For example, if the given time intervals are eight milliseconds, the electronic device may determine to send the audio data to the control device for two milliseconds and determine to send the video data to the display device for six milliseconds during each given time interval.

In some instances, the electronic device determines the first portion and/or the second portion using the total amount of data being sent and/or received by the electronic device. For example, the electronic device may determine the first portion of the given time interval as the portion of the total amount of data that is caused by the control device and determine the second portion of the given time interval as the portion of the total amount of data that is caused by the display device. In some instances, the electronic device may continue to determine new first portions and/or new second portions as the electronic device continues to send and receive data with the control device and the display device. For example, the electronic device may determine a new first portion and/or a new second portion continuously, every second, five seconds, ten seconds, and/or the like.

In some instances, the control device and/or the display device may use one or more techniques to conserve power, such as when the control device and/or the display device use an internal power source (e.g., one or more batteries) for power. For example, the control device may be configured to switch between at least a first mode of operation and a second mode of operation. While operating in the first mode, the control device may activate one or more components, such as by providing power from the internal power source to the one or more components. Alternatively, while operating in the second mode, the control device may deactivate the one or more components, such as by ceasing from providing at least a portion of the power from the internal power source to the one or more components. The one or more components may include, but are not limited to, network interface(s), input device(s) (e.g., button(s), microphone(s), touch-sensitive control(s), etc.), output device(s) (e.g., speaker(s), display(s), haptic device(s), etc.), and/or the like. As such, the control device may consume less power while operating in the second mode than while operating in the first mode.

Additionally, the electronic device may cease from sending data (e.g., the first timestamp data, the audio data, etc.) to the control device while the control device is operating in the second mode. In some instances, the electronic device may determine that the control device is operating in the second mode based at least in part on data received from the control device. For example, the electronic device may receive, from the control device, mode data indicating when the control device is going to remain operating in the first mode or indicating when the control device is going to switch to operating in the second mode. In some instances, the electronic device may receive the mode data as part of a data packet from the control device, where the data packet includes at least the input data and the mode data. In other instances, the electronic device may receive the mode data separate from the data packet. For example, the electronic device may receive the mode data over the second type of network connection with the control device.

In some instances, the electronic device (and/or the remote system) may determine whether the control device should transition to the second mode. For a first example, the electronic device may determine an amount of data that is going to be sent to the control device and/or received from the control device. The electronic device may then determine whether the control device should remain in the first mode or transition the second mode based at least in part on the amount of data. For instance, if the amount of data satisfies a data threshold, then the electronic device may determine that the control device should remain in the first mode. However, if the amount of data does not satisfy the data threshold, then the electronic device may determine that the control device may transition to the second mode. The data threshold may include, but is not limited to, one megabyte per second, one megabyte per minutes, ten megabytes per minutes, and/or any other threshold.

In some instances, the electronic device may determine the amount of data based at least in part on the application that is being controlled by the control device. For instance, if the application includes a gaming application, the electronic device may determine if a next portion of the game requires the remote system to send a great amount of data (e.g., audio data, video data, etc.) to the control device and/or receive a great amount of data (e.g., audio data, input data, etc.) from the control device. The electronic device may then use that determination to determine whether the control device should remain in the first mode or if the control device may transition to the second mode.

For a second example, the electronic device may determine whether the control device can tolerate a greater amount of latency. For instance, and as discussed above, the electronic device sends the audio data to the control device, where the audio data is synchronized with the video data being sent to the display device. As such, the electronic device may determine a latency associated with the video data being sent to the display device. In some instances, the electronic device determines the latency using a RSSI associated with the connection between the electronic device and the display device. In other instances, the electronic device determines the latency based at least in part on data received from the display device, where the data indicates the latency.

In either instance, the electronic device may then determine that the latency satisfies (e.g., is equal to or greater than) a threshold latency. In some instances, the threshold latency may include the given time intervals associated with sending the transmissions between the electronic device and the control device. In other instances, the threshold latency may include a different period of time, such as, but not limited to, one millisecond, five milliseconds, ten milliseconds, and/or another period of time. Based at least in part on determining that the latency satisfies the threshold latency, the electronic device may determine that the control device is able to tolerate a greater amount of latency, but still synchronize the outputting of the audio data with the displaying of the video data. As such, the electronic device may determine that the control device is able to transition to the second mode and/or transition to the second mode for longer periods of time.

For a third example technique, the electronic device may determine one or more characteristics associated network connection(s) between the electronic device and the control device. A network characteristic may include, but is not limited to, a PER, a RSSI, a bit rate error, a wireless channel availability, a number of consecutive packet losses, a packet outage duration, packet arrival time, number of devices connected to the network(s), a number of network(s) for which the electronic device is connected, and/or the like. The electronic device may then use the data to determine when the control device should operate in the first mode and when the control device is able to transition to the second mode. For instance, the electronic device may determine that the control device is able to transition to the second mode when the PER satisfies (e.g., is equal to or greater than) a threshold PER, but determine that the control device should remain in the first mode when the PER does not satisfy (e.g., is below) the threshold PER. Additionally, or alternatively, the electronic device may determine that the control device is able to transition to the second mode when the RSSI does not satisfy a threshold RSSI, but determine that the control device should remain in the first mode when the RSSI satisfies the threshold RSSI.

For a fourth example, the electronic device may receive data indicating that a user associated with the control device is proximate to the control device. The electronic device may receive the data from the control device and/or another electronic device (e.g., a voice-controlled device, a motion sensor, a camera, a user device, etc.) that is located proximate to the control device and/or the electronic device. Using the data, the electronic device may determine that the user is about to use the control device and as such, the control device should transition to the first mode.

For a fifth example, the electronic device may receive data indicating that the user associated with the control device is no longer proximate to the control device. As such, and using the data, the electronic device may determine that the control device is able to transition to the second mode.

Still, for a sixth example, the electronic device may store data indicating time(s) when the control device is likely to be used and time(s) when the control device is unlikely to be used. In some instances, the electronic device may determine the time(s) using data representing a history of times that the control device has been used. The electronic device may then determine that the control device should transition to the first mode during time(s) at which the control device is likely to be used, and determine that the control device should transition to the second mode during time(s) at which the control device is unlikely to be used.

In either of the examples above, the electronic device may send, to the control device, mode data including (1) an instruction for the control device to remain in the first mode, (2) an instruction for the control device to transition to the second mode, and/or (3) an instruction for the control device to operate in the second mode for a time period. In some instances, the electronic device sends the mode data to the control device via the communication channel. Additionally, or alternatively, in some instances, the electronic device sends the mode data to the control device via the second type of network, which is described above. The control device may receive the mode data from the electronic device and, in response, operate according to the instruction(s).

In some instances, in order to conserve power on the control device, the electronic device may continuously send the mode data to the control device via the second type of network, where the mode data includes an instruction to operate in the first mode or an instruction to operate in the second mode. For instance, when the electronic device has data (e.g., audio data) to send to the electronic device, the electronic device may send, to the control device, mode data that includes an instruction to operate in the first mode. In response, the control device may transition to the first mode and receive the data. Additionally, when the electronic device does not have data to send to the control device, the electronic device may send, to the control device, mode data that includes an instruction to operate in the second mode. In response, the control device may transition to the second mode in order to conserve power.

In some instances, the electronic device may send message data representing messages (e.g., alerts, notifications, requests, etc.) to the control device, the display device, and/or another device (e.g., user device, voice-activated device, etc.). For a first example, if the electronic device receives data indicating that another user requests to play the user in a multiplayer game, the electronic device may send message data to the control device, the display device, and/or the other device, where the message data indicates that the user has received the request to play in the multiplayer game. The control device, the display device, and/or the other device may then provide the message to the user. For a second example, if the electronic device receives data indicating that one or more updates are available for a gaming application, the electronic device may send message data to the control device, the display device, and/or the other device, where the message data indicates that the updates are available. The control device, the display device, and/or the other device may then provide the message to the user. In some instances, when sending the message data, the electronic device may use the second type of network.

In some instances, the user may initially configure the control device and/or the display device. As described herein, the control device may include, but is not limited to, a video game controller, a keyboard, a mouse, a tablet, a mobile phone, a computer, a camera, a microphone, and/or any other type of device that is capable of receiving input from the user and/or capable to generating data. To configure the control device, the user may input configuration settings into the control device and/or another device (e.g., the electronic device). If the configuration settings are input into another device, the other device may then send data representing the configuration settings to the control device. The configuration settings may include, but are not limited to, an identifier associated with a network device (e.g., a SSID) associated with the electronic device), a password, and/or the like. The control device may then store data representing the configuration settings. Additionally, the control device may use the configuration settings to connect to the network in order to communicate with the electronic device.

In some instances, the user may further configure the control device with the electronic device and/or the remote system. For instance, the electronic device and/or the remote system may receive, from the control device and/or another device, data representing an identifier of the control device. The electronic device and/or the remote system may then store the data representing the identifier of the control device.

In some instances, the user may further configure one or more display devices with the electronic device and/or the remote system. As described herein, a display device may include, but is not limited to, a television, a projector, a monitor, a tablet, a mobile phone, a peripheral device that connects to another display device, and/or any other type of device that is capable of displaying content (e.g., image(s), videos, etc.) and/or capable of causing another device to display content. To configure a display device, the electronic device and/or the remote system may receive, from the display device and/or another device, data representing an identifier of the display device. The electronic device and/or the remote system may then store the data representing the identifier of the display device. In some instances, the electronic device and/or the remote system may further store data that associates the control device with the display device.

In some instances, the electronic device and the control device may use PS-Poll, automatic power save delivery (APSD), unscheduled APSD (U-APSD), and/or some other power saving technique to send the data between the electronic device and the control device. For instance, the electronic device may buffer the data and then send the data according to the power saving technique. In some instances, the control device may use one or more additional and/or alternative modes of operation in order to conserve power. The modes of operation may include, but are not limited to, (1) a mode of operation where the control device is actively listening for data, receiving data, and sending data, (2) a mode of operation where the control device is able to quickly transition to the first mode of operation (e.g., the radio is off and the radio processor is halted, but baseband phase-locked loop (PLL), crystal are still active), (3) a mode of operation where the control device maintains an association with the network device, but sleeps between beacons, (4) a mode of operation where a system on chip (SoC) completes powering down part of the control device for minimal leakage of device hibernation, and/or the like. As described herein, the first mode and/or the second mode may include one or more of these modes of operation, as well as one or more of the other modes of the operation described herein.

As described herein, the control device may deactivate a component by ceasing providing at least a portion of power to the component. For instance, the network interface(s) may include one or more hardware components, such as processor(s), memory, radio(s), and/or the like. As such, deactivating the network interface(s) may include ceasing from providing power to one or more of the hardware components of the network interface(s). By ceasing from providing the power, the one or more hardware components of the network interface(s) may turn off, which saves power of the control device.

In some instances, the remote system may perform one or more of the techniques described above, with regard to the electronic device, to select at least one communication channel, partition bandwidth, and/or partition a given time interval. In such instances, the remote system may use data received from the electronic device and/or data received from one or more other electronic devices. For example, when selecting a communication channel, the remote system may use data representing metrics associated with communication channels, where the remote system receives the data from the electronic device and/or the one or more other electronic devices. The remote system may then send, to the electronic device, data indicating the at least one communication that is selected.

Additionally, in some instances, the display device may include a wired connection, such as an Ethernet connection. In such instances, the electronic device may determine that the display device has the wired connection. The electronic device may then send, to the control device, data that includes an instruction for the control device to communicate with the display device using the second type of network.

Furthermore, in some instances, the control device may send at least some of the data described above to and/or receive at least one of the data described above from the network device. For example, the control device may send the input data to the network device, but receive the audio data from the electronic device.

FIG. 1 is a schematic diagram of an example system 100 using an electronic device 102 for network applications, according to various examples of the present disclosure. The system 100 may include, for example, the electronic device 102, a remote system 104, a network device 106 (e.g., an access point), a control device 108, and a display device 110. In the example of FIG. 1, the control device 108 may communicate with the remote system 104 via the electronic device 102. For instance, the control device 108 may send data to the electronic device 102, which may then send the data to the remote system 104 via network(s) 112. Additionally, the remote system 104 may send data to the electronic device 102 via the network(s) 112, which may then send the data to the control device 108. Furthermore, the remote system 104 may communicate with the display device 110 via the electronic device 102. For instance, the remote system 104 may send data to the electronic device 102 via the network(s) 112, which may then send the data to the display device 110.

In some instances, the remote system 104 may store application data 114 representing one or more applications that are accessible by the control device 108 via the network(s) 112. An application may include, but is not limited to, a gaming application, a word processing application, an educational application, a multimedia application (e.g., movie, music, etc.), and/or any other type of application that is capable of being accessed via the network(s) 112. While accessing an application, the control device 108 may receive inputs from a user 116. The control device 108 may then send, to the remote system 104, input data 118 representing the inputs. The remote system 104 may then use a processing component 120 to update a current state of the application based at least in part on the input data 118.

The remote system 104 may then send, to the electronic device 102, data representing the current state of the application. The data may include, but is not limited to, video data 122 representing image(s) of the current state of the application, audio data 124 representing sound corresponding to the current state of the application, and/or timestamp data 126 representing a time for displaying the image(s) and/or a time for outputting the sound. In some instances, the remote system 104 sends a data packet that includes the video data 122, the audio data 124, and/or the timestamp data 126. In other instances, the remote system 104 may separately send the video data 122, the audio data 124, and/or the timestamp data 126 to the electronic device 102.

The electronic device 102 may then send the video data 122, the audio data 124, and/or the timestamp data 126 to the display device 110. In some instances, the electronic device 102 may send a data packet that includes the video data 122, the audio data 124, and/or the timestamp data 126. In other instances, the electronic device 102 may separately send the video data 122, the audio data 124, and/or the timestamp data 126. In either instance, using the video data 122, the display device 110 may display image(s) representing the current state of the application. For example, if the application includes a gaming application, the display device 110 may display content representing a current state of the game. In the example of FIG. 1, the current state of the game may include an object (e.g., a character) located at a position in a gaming environment (e.g., a forest). In some instances, the display device 110 may further output the sound represented by the audio data 124. In some instances, the display device 110 displays the image(s) and/or outputs the sound according to the time(s) represented by the timestamp data 126.

For example, the display device 110 may determine when a current time includes the time represented by the timestamp data 126 for displaying the video data 122. Based at least in part on the determination, the display device 110 may begin displaying the image(s) representing the current state of the application. Additionally, the display device 110 may determine when a current time includes the time represented by the timestamp data 126 for outputting the sound. Based at least in part on the determination, the display device 110 may begin outputting the sound represented by the audio data 124.

The electronic device 102 may further send the video data 122, the audio data 124, and/or the timestamp data 126 to the control device 108. In some instance, the electronic device 102 may send a data packet that includes the video data 122, the audio data 124, and/or the timestamp data 126. In other instances, the electronic device 102 may separately send the video data 122, the audio data 124, and/or the timestamp data 126. In either instance, the control device 108 may then output the sound represented by the audio data 124, which is represented by 128. In some instances, the control device 108 may output the sound according to the time represented by the timestamp data 126. In such instances, the timestamp data 126 synchronizes the outputting of the sound by the control device 108 with the displaying of the image(s) by the display device 110.

For instance, a synchronization component 130 of the remote system 104 may be configured to synchronize at least the displaying of the image(s) by the display device 110 with the outputting of the sound by the control device 108. To perform the synchronization, the synchronization component 130 may generate first timestamp data 126 for outputting the sound represented by the audio data 124 and/or second timestamp data 126 for displaying the image(s) represented by the video data 122. For instance, the first timestamp data 126 may include an instruction to output the sound at a first time. Additionally, the second timestamp data 126 may include an instruction to display the image(s) at a second time. In some instances, the first time may be similar to the second time. In some instances, the first time may be within a threshold period of time to the second time. The threshold period of time may include, but is not limited to, one millisecond, ten milliseconds, one second, and/or the like.

The user 116 can then use the control device 108 to provide inputs to the application. For instance, the control device 108 may receive an input, such as a selection of a button, joystick, key, touch-sensitive pad, sensor, and/or the like associated with the control device 108. The control device 108 may then send, to the remote system 104 via the electronic device 102, the input data 118 representing the input. Using the input data 118, the processing component 120 may update the state of the application. For example, and using the example above where the application includes the gaming application, the input may be associated with moving the object forward by a given amount within the gaming environment. As such, the processing component 120 may analyze the input data 118 to determine that the input includes moving the object forward by the given amount. The processing component 120 may then update the state of the of the application by moving the object forward in the gaming environment by the given amount.

The remote system 104 may then send, to the electronic device 102, additional video data 122, additional audio data 124, and/or additional timestamp data 126 representing the new state of the application. The electronic device 102 may then send the additional video data 122, the additional audio data 124, and/or the additional timestamp data 126 to the display device 110 and/or the control device 108. Similar to the techniques described above, the display device 110 may then display image(s) represented by the additional video data 122 while the control device 108 is outputting the sound represented by the additional audio data 124.

In some instances, the remote system 104 may continue to receive the input data 118 from the control device 108 via the electronic device 102. The processing component 120 may then continue to process the input data 118 in order to update the state of the application. Based at least in part on the updating, the remote system 104 may continue to send, to the electronic device 102, the video data 122, the audio data 124, and/or the timestamp data 126 representing the current state of the application. Additionally, the electronic device 102 may continue to send the video data 122, the audio data 124, and/or the timestamp data 126 to the display device 110 and/or the control device 108. Using the data, the control device 108 may continue to synchronize the outputting of the sound with the displaying of the content by the display device 110.

In the example of FIG. 1, the electronic device 102 may perform one or more techniques to synchronize the sound being output by the control device 108 with the image(s) being displayed by the display device 110. For a first example, the electronic device 102 may send, to the control device 108, the first timestamp data 126 and the audio data 124 (e.g., from the data packet). As discussed above, the first timestamp data 126 may include a first instruction to output the sound at a first time represented by the first timestamp. Additionally, the electronic device 102 may send, to the display device 110, the second timestamp data 126 and the video data 122 (e.g., from the data packet). As discussed above, the second timestamp data 126 may include a second instruction to display the image(s) at a second time represented by the second timestamp. As such, the control device 108 may use the first timestamp data 126 to output the sound represented by the audio data 124 in synchronization with the display device 110 displaying the image(s) represented by the video data 122.

For a second example, the electronic device 102 may use the first timestamp data 126 to determine when to send the audio data 124 to the control device 108 and/or use the second timestamp data 126 to determine when to send the video data 122 to the display device 110. For instance, the electronic device 102 may determine that a current time includes the first time represented by the first timestamp data 126 and/or that the current time is within a threshold period of time to the first time. Based at least in part on the determination, the electronic device 102 may send, to the control device 108, the audio data 124 for output by the control device 108. Additionally, the electronic device 102 may determine that the current time includes the second time represented by the second timestamp data 126 and/or that the current time is within a threshold period of time to the second time. Based at least in part on the determination, the electronic device 102 may send, to the display device 110, the video data 122 for output by the display device 110. As such, the control device 108 may receive the audio data 124 and then begin outputting the sound represented by the audio data 124 in synchronization with the display device 110 displaying the image(s) represented by the video data 122.

In some instances, to synchronize the sound being output by the control device 108 with the image(s) being displayed by the display device 110, the electronic device 102 may prioritize the audio data 124 and/or the video data 122. For a first example, the electronic device 102 may use the second timestamp data 126 to determine that image(s) represented by the video data 122 are about to expire. In some instances, the electronic device 102 may make the determination based at least in part on the second time(s) associated with the image(s) being within a threshold period of time to the current time. The electronic device 102 may further use the first timestamp data 126 to determine that sound represented by the audio data 124 is not about to expire. In some instances, the electronic device 102 may make the determination based at least in part on the first time(s) associated with the sound being outside of the threshold period of time to the current time. Based at least in part on the determinations, the electronic device 102 may prioritize the video data 122 over the audio data 124. As such, the electronic device 102 may send the video data 122 to the display device 110 before sending the audio data 124 to the control device 108.

For a second example, the electronic device 102 may use the first timestamp data 126 to determine that sound represented by the audio data 124 is about to expire. In some instances, the electronic device 102 may make the determination based at least in part on the first time(s) associated with the sound being within a threshold period of time to the current time. The electronic device 102 may further use the second timestamp data 126 to determine that image(s) represented by the video data 122 are not about to expire. In some instances, the electronic device 102 may make the determination based at least in part on the second time(s) associated with the image(s) being outside of the threshold period of time to the current time. Based at least in part on the determinations, the electronic device 102 may prioritize the audio data 124 over the video data 122. As such, the electronic device 102 may send the audio data 124 to the control device 108 before sending the video data 122 to the display device 110.

For a third example, the electronic device 102 may use the first timestamp data 126 to determine that sound represented by the audio data 124 is about to expire and use the second timestamp data 126 to determine that image(s) represented by the video data 122 are about to expire. Based at least in part on the determinations, the electronic device 102 may prioritize the video data 122 over the audio data 124. This may be because the image(s) being displayed by the display device 110 are more important for updating the state of the application for the user 116 than the sound being output by the control device 108. The electronic device 102 may then send the video data 122 to the display device 110. Additionally, the electronic device 102 may (1) send the audio data 124 to the control device 108 after sending the video data 122 (e.g., if the audio data 124 has yet to expire), (2) delete the audio data 124, and/or (3) refrain from sending the audio data 124. In some instances, the electronic device 102 may perform similar processes, but prioritize the audio data 124 over the video data 122 (e.g., such as when the audio data 124 is more important for updating the state of the application for the user 116).

In some instances, to synchronize the sound being output by the control device 108 with the content being displayed by the display device 110, the electronic device 102 may select communication channel(s) for sending and/or receiving the data. For instance, the electronic device 102 may scan multiple communication channels in order to determine respective metrics for each communication channel, where the metrics may be represented by channel data 134. The electronic device 102 may then use the metrics to select at least one communication channel. In some instances, the electronic device 102 selects the at least one communication channel that includes the least amount of congestion. The electronic device 102 may then send, to the control device 108 and/or the display device 110, channel data 134 indicating the at least one communication channel. After sending the channel data 134, the electronic device 102 may establish network connections with the control device 108 and/or the display device 110 using the at least one communication channel.

Additionally, or alternatively, in some instances, the electronic device 102 may send, to the remote system 104, the network data 132 representing respective metrics for each communication channel. The remote system 104 may then use a channel component 136 to select the at least one communication channel, using similar processes as the electronic device 102. The electronic device 102 may then receive, from the remote system 104, channel data 134 representing the at least one communication channel. Additionally, the electronic device 102 may send, to the control device 108 and/or the display device 110, channel data 134 indicating the at least one communication channel. After sending the channel data 134, the electronic device 102 may establish network connections with the control device 108 and/or the display device 110 using the at least one communication channel.

In some instances, the remote system 104 may receive network data 132 from more than one electronic device located in more than one environment. The channel component 136 may then analyze the metrics included in the network data 132 to identify at least one communication channel for the electronic device 102 to use when communicating with the control devices 108 and/or the display devices 110. The electronic device 102 may then receive, from the remote system 104, channel data 134 representing the at least one communication channel. By using the network data 132 from multiple electronic devices located in multiple environments, the remote system 104 may be able to initially determine at least one communication channel for the electronic device 102 before receiving any network data 132 from the electronic device 102. As such, the electronic device 102 may initially be configured to communicate with the control device 108 and/or the display device 110 using the least congested communication channel.

In some instances, when sending the channel data 134, the electronic device 102 may send the channel data 134 using a network that is different from the network the electronic device 102 uses to send the audio data 124 and/or the video data 122. For instance, the communication channel may be associated with a first type of network 138. The first type of network 138 may include, but is not limited to, the Internet, a local intranet, a PAN, a LAN, a WAN, and/or the like. Additionally, the electronic device 102 may use a second type of network 140 to send other data, such as the channel data 134, to the control device 108 and/or the display device 110. The second type of network 140 may include, but is not limited to, Bluetooth, ZigBee, Z-Wave, a LPWAN, and/or the like. In some instances, it may take more power sending and/or receiving data over the first type of network 138 than sending and/or receiving data over the second type of network 140.

In some instances, the electronic device 102 may further send, to the control device 108 and/or the display device 110, identifier data 142 representing an identifier for communicating with the electronic device 102. The identifier may include, but is not limited to, a SSID, an IP address, a MAC address, a numerical identifier, an alphabetic identifier, a mixed numerical and alphabetic identifier, and/or any other type of identifier. In some instances, the electronic device 102 sends the identifier data 142 using the first type of network 138. Additionally, or alternatively, in some instances, the electronic device 102 sends the identifier data 142 using the second type of network 140. Still, in some instances, the electronic device 102 updates the identifier and then sends new identifier data 142 when an event occurs. The event may include, but is not limited to, the elapse of a period of time, the electronic device 102 detecting an unauthorized device (e.g., a device other than the control device 108 and the display device 110) using the identifier, input received from the user 116, and/or the like.

In some instances, to synchronize the sound being output by the control device 108 with the image(s) being displayed by the display device 110, the electronic device 102 may determine how to partition the bandwidth that is available via the communication channel. For a first example, the electronic device 102 may determine to use a first percentage (e.g., 10%, 20%, 30%, etc.) of the bandwidth to send the audio data 124 and determine to use a second percentage (e.g., 70%, 80%, 90%,) of the bandwidth to send the video data 122. For a second example, the electronic device 102 may determine to use a first percentage (e.g., 10%, 20%, 30%, etc.) of the bandwidth to communicate with the control device 108 and determine to use a second percentage (e.g., 70%, 80%, 90%,) of the bandwidth to communicate with the display device 110. In such instances, the electronic device 102 may make the determinations based at least in part on the data being communicated between the devices.

For instance, the electronic device 102 may determine that the electronic device 102 is sending and receiving a first amount of data with the control device 108. The electronic device 102 may further determine that the electronic device 102 is sending and receiving a second amount of data with the display device 110. Using the first amount of data and the second amount of data, the electronic device 102 may partition the bandwidth that is available via the communication channel. For example, the electronic device may determine a total amount of data using the first amount of data and the second amount of data (e.g., adding the first amount of data and the second amount of data). The electronic device 102 may then determine the first percentage based at least in part on the portion of the total amount of data that is caused by the control device 108 (e.g., the total amount of data divided by the first amount of data). Additionally, the electronic device 102 may determine the second percentage based at least in part on the portion of the total amount of data that is caused by the display device 110 (e.g., the total amount of data divided by the second amount of data). While this is just one example of partitioning the bandwidth, in other examples, the electronic device 102 may use one or more other techniques to partition the bandwidth.

Additionally to, or alternatively from, partitioning the bandwidth, in some instances, the electronic device 102 may partition the given time periods that the electronic device 102 uses to send and receive data with the control device 108. For instance, and as discussed above, the electronic device 102 may be sending data to and/or receiving data from the control device 108 at the given time intervals. As such, the electronic device 102 may determine to send the audio data 124 to the control device 108 during a first portion of a given time interval and determine to send the video data 122 to the display device 110 during a second portion of the given time interval. For example, if the given time intervals are eight milliseconds, the electronic device 102 may determine to send the audio data 124 to the control device 108 for two milliseconds and determine to send the video data 122 to the display device 110 for six milliseconds during each given time interval.

In some instances, the electronic device 102 determines the first portion and/or the second portion using the total amount of data being sent and/or received by the electronic device 102. For example, the electronic device 102 may determine the first portion of the given time interval based at least in part on the portion of the total amount of data that is caused by the control device 108 and determine the second portion of the given time interval based at least in part on the portion of the total amount of data that is caused by the display device 110. For example, if the total amount of data being sent and received by the electronic device 102 is eight megabytes of data per minute, the electronic device 102 is sending and receiving two megabytes of data per minute with the control device 108, and the electronic device 102 is sending and receiving six megabytes of data per minute with the display device 110, then the electronic device 102 may determine to send and receive data with the control device 108 for two milliseconds of the eight millisecond time period and determine to send and receive data with the display device 110 for six milliseconds of the eight millisecond time period.

In some instances, the electronic device 102 may continuously determine how to partition the bandwidth and/or continuously determine how to partition the given time intervals. For instance, the electronic device 102 may determine new partitions for the bandwidth and/or determine new partitions for the given time intervals based at least in part on the amount of data the electronic device 102 sends and receives during a period of time. The period of time may include, but is not limited to, every second, every five seconds, every ten seconds, and/or the like. In some instances, the period of time may include a "rolling" period of time, where the electronic device 102 uses the most recent period of time to determine the new partitions for the bandwidth and/or determine new partitions for the given time intervals. Additionally, in some instances, the remote system 104 may continuously determine how to partition the bandwidth and/or continuously determine how to partition the given time intervals, using similar processes as the electronic device 102. In such instances, the electronic device 102 may then receive, from the remote system 104, data indicating how to partition the bandwidth and/or partition the given time intervals.

In the example of FIG. 1, the control device 108 may be configured to transition between at least the first mode of operation and the second mode of operation in order to conserve power. While the control device 108 is operating in the second mode, the electronic device 102 may cease from sending data (e.g., the timestamp data 126, the audio data 124, etc.) to the control device 108. In some instances, the electronic device 102 may determine that the control device 108 is operating in the second mode based at least in part on data received from the control device 108. For example, the electronic device 102 may receive, from the control device 108, mode data 144 indicating when the control device 108 is going to remain operating in the first mode or mode data 144 indicating when the control device 108 is going to switch to operating in the second mode. In some instances, the electronic device 102 may receive the mode data 144 as part of a data packet from the control device 108, where the data packet includes at least the input data 118 and the mode data 144. In other instances, the electronic device 102 may receive the mode data 144 separate from the data packet and/or the input data 118. For example, the electronic device 102 may receive the mode data 144 over the second type of network 140.

In some instances, the electronic device 102 may determine whether the control device 108 should transition to the second mode. For a first example, the electronic device 102 may determine an amount of data that is going to be sent to the control device 108 and/or received from the control device 108. The electronic device 102 may then determine whether the control device 108 should remain in the first mode or transition the second mode based at least in part on the amount of data. For instance, if the amount of data satisfies (e.g., is equal to or greater than) a data threshold, then the electronic device 102 may determine that the control device 108 should remain in the first mode. However, if the amount of data does not satisfy (e.g., is less than) the data threshold, then the electronic device 102 may determine that the control device 108 may transition to the second mode. The data threshold may include, but is not limited to, one megabyte per second, one megabyte per minutes, ten megabytes per minutes, and/or any other threshold.

In some instances, the electronic device 102 may determine the amount of data based at least in part on the application that is being controlled by the control device 108. For instance, if the application includes a gaming application, the electronic device 102 may determine if a next portion of the game requires the remote system 104 to send a great amount of data (e.g., audio data 124, video data 122, etc.) to the control device 108 and/or receive a great amount of data (e.g., audio data 124, input data 118, etc.) from the control device 108. The electronic device 102 may then use that determination to determine whether the control device 108 should remain in the first mode or if the control device 108 may transition to the second mode.

For a second example, the electronic device 102 may determine whether the control device 108 can tolerate a greater amount of latency. For instance, and as discussed above, the electronic device 102 sends the audio data 124 to the control device 108, where the audio data 124 is synchronized with the video data 122 being sent to the display device 110. As such, the electronic device 102 may determine a latency associated with the video data 122 being sent to the display device 110. In some instances, the electronic device 102 determines the latency using a RSSI associated with the network connection between the electronic device 102 and the display device 110. In some instances, the electronic device 102 determines the latency using other characteristics associated with the network connection between the electronic device 102 and the control device 108, which are described herein. Still, in other instances, the electronic device 102 determines the latency based at least in part on data received from the display device 110, where the data indicates the latency.

In either instance, the electronic device 102 may then determine that the latency satisfies a threshold latency. In some instances, the threshold latency may include the given time intervals associated with sending the transmissions between the electronic device 102 and the control device 108. In other instances, the threshold latency may include a different period of time, such as, but not limited to, one millisecond, five milliseconds, ten milliseconds, and/or another period of time. Based at least in part on determining that the latency satisfies the threshold latency, the electronic device 102 may determine that the control device 108 is able to tolerate a greater amount of latency, but still synchronize the outputting of the audio data 124 with the displaying of the video data 122. As such, the electronic device 102 may determine that the control device 108 is able to transition to the second mode and/or transition to the second mode for longer periods of time.

For a third example, the electronic device 102 may determine one or more characteristics associated with network connection(s) between the electronic device 102 and the control device 108. The electronic device 102 may then use the one or more characteristics to determine when the control device 108 should operate in the first mode and when the control device 108 is able to transition to the second mode. For instance, the electronic device 102 may determine that the control device 108 is able to transition to the second mode when the PER satisfies a threshold PER, but determine that the control device 108 should remain in the first mode when the PER does not satisfy the threshold PER. Additionally, or alternatively, the electronic device 102 may determine that the control device 108 is able to transition to the second mode when the RSSI does not satisfy a threshold RSSI, but determine that the control device 108 should remain in the first mode when the RSSI satisfies the threshold RSSI.

For a fourth example, the electronic device 102 may receive data indicating that the user 116 associated with the control device 108 is proximate to the control device 108. The electronic device 102 may receive the data from the control device 108 and/or another electronic device (e.g., a voice-controlled device, a motion sensor, a camera, a user device, etc.) that is located proximate to the control device 108 and/or the electronic device 102. Using the data, the electronic device 102 may determine that the user 116 is about to use the control device 108 and as such, the control device 108 should transition to the first mode.

For a fifth example, the electronic device 102 may receive data indicating that the user 116 associated with the control device 108 is no longer proximate to the control device 108. As such, and using the data, the electronic device 102 may determine that the control device 108 is able to transition to the second mode.

Still, for a sixth example, the electronic device 102 may store data indicating time(s) when the control device 108 is likely to be used and time(s) when the control device 108 is unlikely to be used. In some instances, the electronic device 102 may determine the time(s) using data representing a history of times that the control device 108 has been used. The electronic device 102 may then determine that the control device 108 should transition to the first mode during time(s) at which the control device 108 is likely to be used, and determine that the control device 108 should transition to the second mode during time(s) at which the control device 108 is unlikely to be used.

In either of the examples above, the electronic device 102 may send, to the control device 108, mode data 144 including (1) an instruction for the control device 108 to remain in the first mode, (2) an instruction for the control device 108 to transition to the second mode, and/or (3) an instruction for the control device 108 to operate in the second mode for a time period. In some instances, the electronic device 102 sends the mode data 144 to the control device 108 via the communication channel. Additionally, or alternatively, in some instances, the electronic device 102 sends the mode data 144 to the control device 108 via the second type of network 140. The control device 108 may receive the mode data 144 from the electronic device 102 and, in response, operate according to the instruction(s).

In some instances, in order to conserve power on the control device 108, the electronic device 102 may continuously send the mode data 144 to the control device 108 via the second type of network 140, where the mode data 144 includes an instruction to operate in the first mode or an instruction to operate in the second mode. For instance, when the electronic device 102 has data (e.g., audio data 124) to send to the electronic device 102, the electronic device 102 may send, to the control device 108, mode data 144 that includes an instruction to operate in the first mode. In response, the control device 108 may transition to the first mode and receive the data. Additionally, when the electronic device 102 does not have data to send to the control device 108, the electronic device 102 may send, to the control device 108, mode data 144 that includes an instruction to operate in the second mode. In response, the control device 108 may transition to the second mode in order to conserve power.

In the example of FIG. 1, the remote system 104 further includes processor(s) 146, network interface(s) 148, and memory 150. As used herein, a processor, such as the processor(s) 146, may include multiple processors and/or a processor having multiple cores. Further, the processors may comprise one or more cores of different types. For example, the processors may include application processor units, graphic processing units, and so forth. In one instance, the processor may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-ona-chip systems (SOCs), complex programmable logic devices (CPLDs), etc. Additionally, each of the processor(s) may possess its own local memory, which also may store program components, program data, and/or one or more systems.

Memory, such as the memory 150, may include volatile and nonvolatile memory, removable and non-removable media implemented in any method or technology for storage of information, such as computer-readable instructions, data structures, program component, or other data. The memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic instance, CRSM may include random access memory ("RAM") and Flash memory. In other instances, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Wash., USA; the Windows operating system from Microsoft Corporation of Redmond, Wash., USA; LynxOS as promulgated by Lynx Software Technologies, Inc. of San Jose, Calif.; Operating System Embedded (Enea OSE) as promulgated by ENEA AB of Sweden; and so forth.

Network interface(s), such as the network interface(s) 148, may enable data to be sent between devices. For example, the network interface(s) 148 may enable data to be sent between the remote system 104, the electronic device 102, the control device 108, the display device 110, and/or with one or more other remote systems, as well as other networked devices. The network interface(s) may include one or more network interface controllers (NICs) or other types of transceiver devices to send and receive messages over the network(s) 112.

For instance, each of the network interface(s) may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) may include a wide area network (WAN) component to enable message over a wide area network.

The operations and/or functionalities associated with and/or described with respect to the components of the remote system 104 may be performed utilizing cloud-based computing resources. For example, web-based systems such as Elastic Compute Cloud systems or similar systems may be utilized to generate and/or present a virtual computing environment for performance of some or all of the functionality described herein. Additionally, or alternatively, one or more systems that may be configured to perform operations without provisioning and/or managing servers, such as a Lambda system or similar system, may be utilized.

Figure 2:
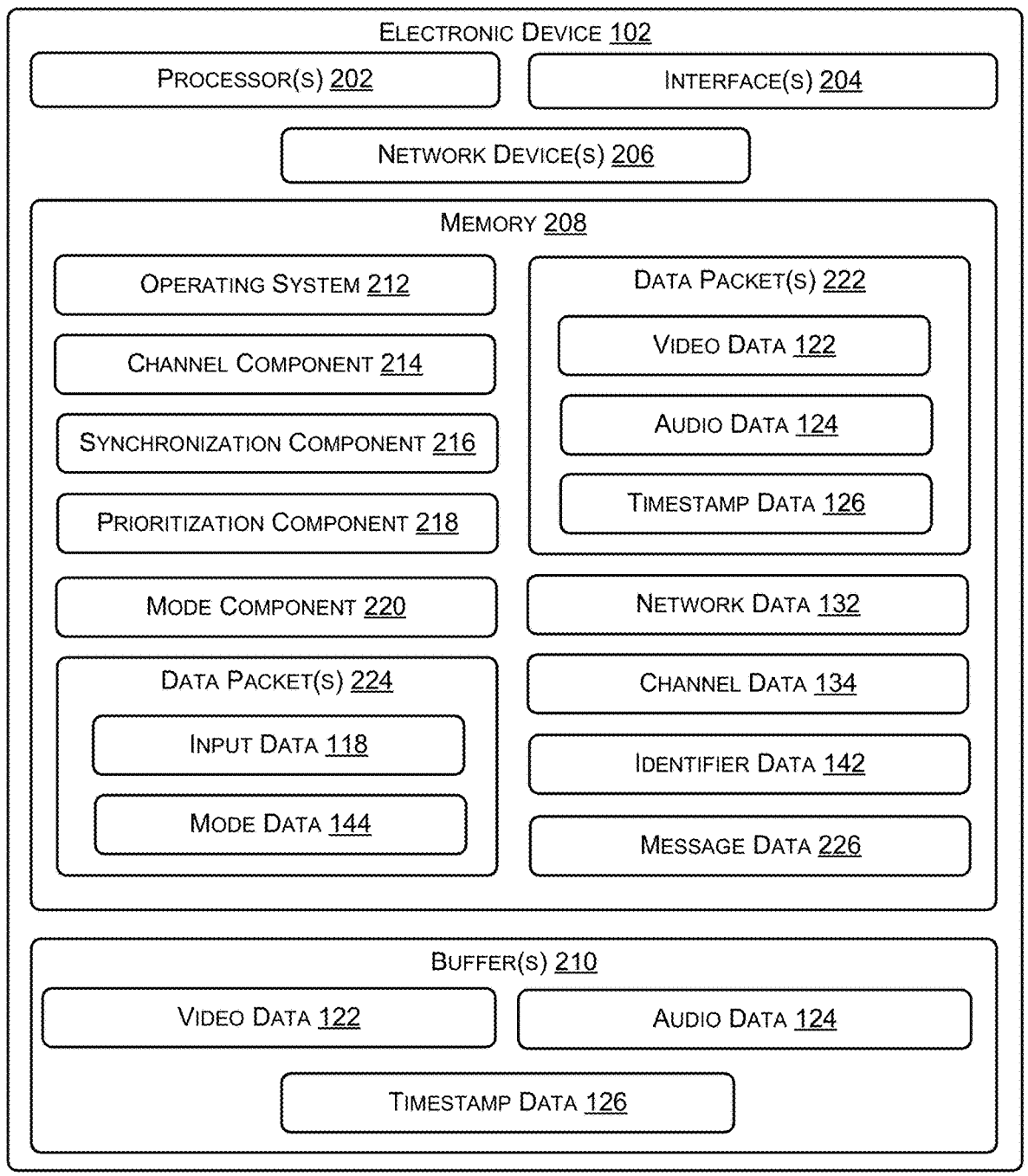
FIG. 2 illustrates a block diagram of an example architecture of an electronic device, according to various examples of the present disclosure.

FIG. 2 illustrates a block diagram of an example architecture of the electronic device 102, according to various examples of the present disclosure. As shown, the electronic device 102 includes processor(s) 202, network interface(s) 204, network device(s) 206, memory 208, and buffer(s) 210 (which, in some examples, may be included as part of the memory 208). In some instances, the electronic device 102 may include one or more additional components no illustrated in the example of FIG. 2. For example, the electronic device may include speaker(s), microphone(s), light(s), output device(s), internal power source(s), and/or the like.

The network device(s) 206 may include cable(s), wire(s), and/or other hardware components that the electronic device 102 uses to connect to a network device, such as the network device 106. For example, the network device(s) 206 may include an Ethernet cable that the electronic device 102 uses to connect to the network device 106.

The electronic device 102 may include memory 208. The memory 208 may be used to store any number of software components that are executable by the processor(s) 202. Software components stored in the memory 208 may include an operating system 212 that is configured to manage hardware and services within and coupled to the electronic device 102. In addition, executable components stored by the memory 208 may include a channel component 214, a synchronization component 216, a prioritization component 218, and a mode component 220. In some instances, the electronic device 102 may not include one or more of the channel component 214, the synchronization component 216, the prioritization component 218, or the mode component 220. Additionally, or alternatively, in some instances, the electronic device 102 may include one or more additional components.

The channel component 214 may be configured to scan various communication channels in order to determine respective metrics for the communication channels, where the metrics may be represented by network data 132. After determining the metrics, the channel component 214 may be configured to select at least one communication channel based at least in part on the metrics, using the processes described herein. In some instances, the channel component 214 selects one communication channel for all control device(s) and display device(s). In some instances, the channel component 214 selects a communication channel for a control device and display device combination. Still, in some instances, the channel component 214 selects a respective communication channel for each control device and/or display device.

The synchronization component 216 may be configured to synchronize the outputting of the audio data 124 with the displaying of the video data 122. For example, the electronic device 102 may receive data packet(s) 222 from the remote system 104, where the data packet(s) 222 include the video data 122, the audio data 124, and/or the timestamp data 126. The synchronization component 216 may then use one or more of the processes described herein to cause the electronic device 102 to send the audio data 124 to the control device 108 and the video data 122 to the display device 110. In some examples, while waiting to send the video data 122, the audio data 124, and/or the timestamp data 126 to the control device 108 during the synchronization, the electronic device 102 may store the video data 122, the audio data 124, and/or the timestamp data 126 in the buffer(s) 210.

The prioritization component 218 may be configured to prioritize the data that is sent by the electronic device 102. For a first example, the prioritization component 218 may use one or more of the processes described herein to prioritize the video data 122 over the audio data 124. For a second example, the prioritization component 218 may use one or more of the processes described herein to prioritize the audio data 124 over the video data 122. In either example, the electronic device 102 may then be configured to send the audio data 124 to the control device 108 and/or the video data 122 to the display device 110 according to the determined priorities.

The mode component 220 may be configured to determine when the control device 108 should operate in the first mode, when the control device 108 is able to transition to the second mode, and/or an amount of time that the control device 108 should remain in the second mode. For a first example, the mode component 220 may use one or more of the processes described herein to determine the mode based at least in part on the network data 132. For a second example, the mode component 220 may determine that the control device 108 should operate in the first mode when the electronic device 102 has data to send to the control device 108 and determine that the control device 108 should operate in the second mode when the electronic device does not have data to send to the control device 108.

As further illustrated in the example of FIG. 2, the electronic device 102 may receive data packet(s) 224 from the control device 108. For example, the electronic device 102 may receive the data packet(s) 224 at the expiration of the given time intervals. As shown, the data packet(s) 224 may include at least the input data 118 and the mode data 144.

Figure 6:
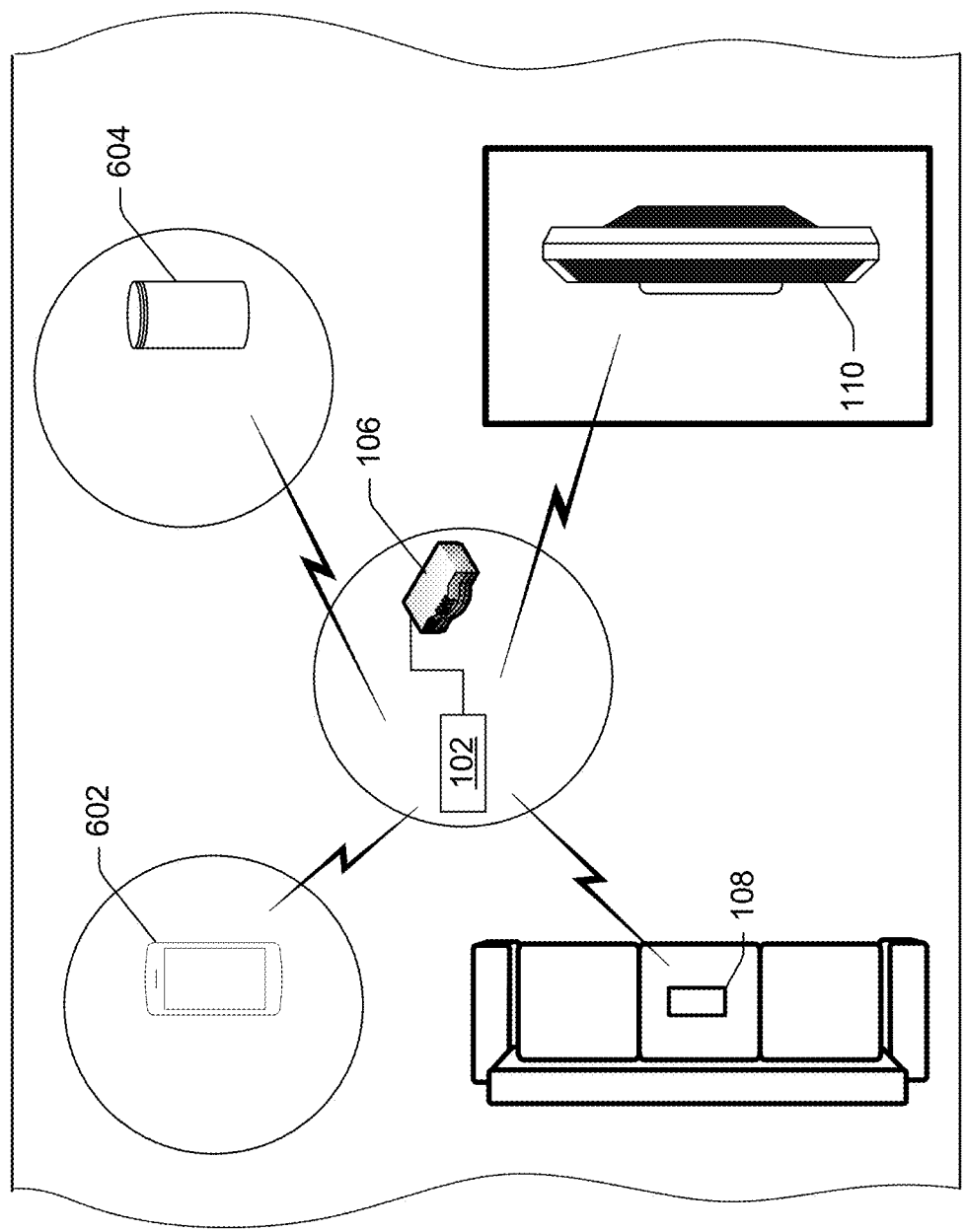
FIG. 6 illustrates a schematic diagram of an example system that includes an electronic device sending messages to other devices, according to various examples of the present disclosure.

Furthermore, the electronic device 102 may generate message data 226 representing message(s) for the user of the control device 108. A message may include, but is not limited to, an alert, a request, a notification, and/or any other type of message that the electronic device 102 is able to send to another device. Examples of the electronic device 102 sending data to other devices is illustrated in FIG. 6.

In some instances, the network interface(s) 204 may include at least a first network interface 204 for communicating over the first type of network and a second network interface 204 for communicating over the second type of network. Additionally, in some instances, the network interface(s) 204 may include a first network interface 204 for communicating over a first communication channel, a second network interface 204 for communicating over a second communication channel, a third network interface 204 for communicating over a third communication channel, and/or so forth.

Figure 3:
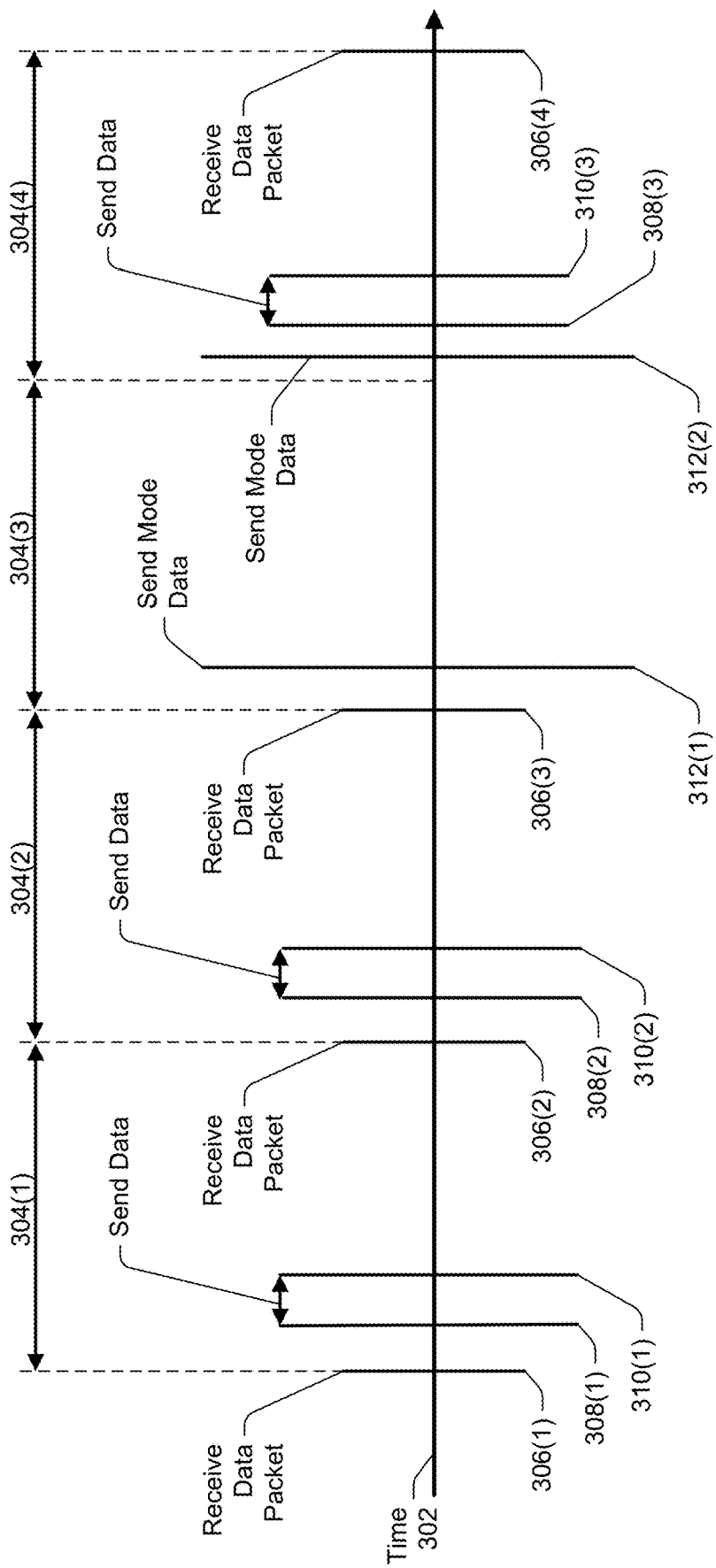
FIG. 3 illustrates an example of an electronic device receiving low-latency transmissions from a control device, according to various examples of the present disclosure.

FIG. 3 illustrates an example of the electronic device 102 receiving low-latency transmissions while the control device 108 is conserving power, according to various examples of the present disclosure. For example, and as discussed above, over a period of time 302, the electronic device 102 may receive data packets 224 from the control device 108 at given time intervals 304(1)-(4). For instance, at time 306(1), the electronic device 102 may receive a first data packet 224 from the control device 108, where the first data packet 224 includes at least first input data 118 representing a first input. Additionally, at time 306(2), the electronic device 102 may receive a second data packet 224 from the control device 108, where the second data packet 224 includes at least second input data 118 representing a second input. Furthermore, at time 306(3), the electronic device 102 may receive a third data packet 224 from the control device 108, where the third data packet 224 includes at least third input data 118 representing a third input. Moreover, at time 306(4), the electronic device 102 may receive a fourth data packet 224 from the control device 108, where the fourth data packet 224 includes at least fourth input data 118 representing a fourth input.

During the given time intervals 304(1)-(4), the electronic device 102 may be sending data to the control device 108, such as the audio data 124. For example, the electronic device 102 may send first audio data 124 to the electronic device 102 between time 308(1) and time 310(1), which occur within the first time interval 304(1). Additionally, the electronic device 102 may send second audio data 124 to the electronic device 102 between time 308(2) and time 310(2), which occur during the second time interval 304(2). In some instances, the control device 108 may switch to the second mode between time 310(1) and time 306(2), such as when the control device 108 is not sending or receiving data. Additionally, the control device 108 may switch to the second mode between time 310(2) and time 306(3), such as when the control device 108 is again not sending or receiving data.

As further illustrated in the example of FIG. 3, the electronic device 102 may determine that the electronic device 102 does not have data to send to the control device 108 at time 312(1). As such, the electronic device 102 may send, to the control device 108, mode data 144 that includes an instruction for the control device 108 to switch to the second mode. Later, at time 312(2), the electronic device 102 may determine that the electronic device 102 has data to send to the control device 108, such as third audio data 124. As such, the electronic device 102 may send, to the control device 108, mode data 144 that includes an instruction for the control device 108 to switch to the first mode. The electronic device 102 may then send the third audio data 124 to the electronic device 102 between time 308(3) and time 310(3), which occur within the fourth time interval 304(1).

Although not illustrated in the example of FIG. 3, during the time intervals 304(1)-(4), the electronic device 102 may further be sending data to the display device 110. In some instances, the electronic device 102 may be sending the data to the display device 110 anytime during the time intervals 304(1)-(4). In some instances, the electronic device 102 may be sending the data to the display device 110 during times at which the electronic device 102 is not sending the data to the control device 108. For examples, the electronic device 102 may be sending the data to the display device 110 between time 310(1) and time 308(2), between time 310(2) and time 308(3), and/or after time 310(3).

Figure 4:
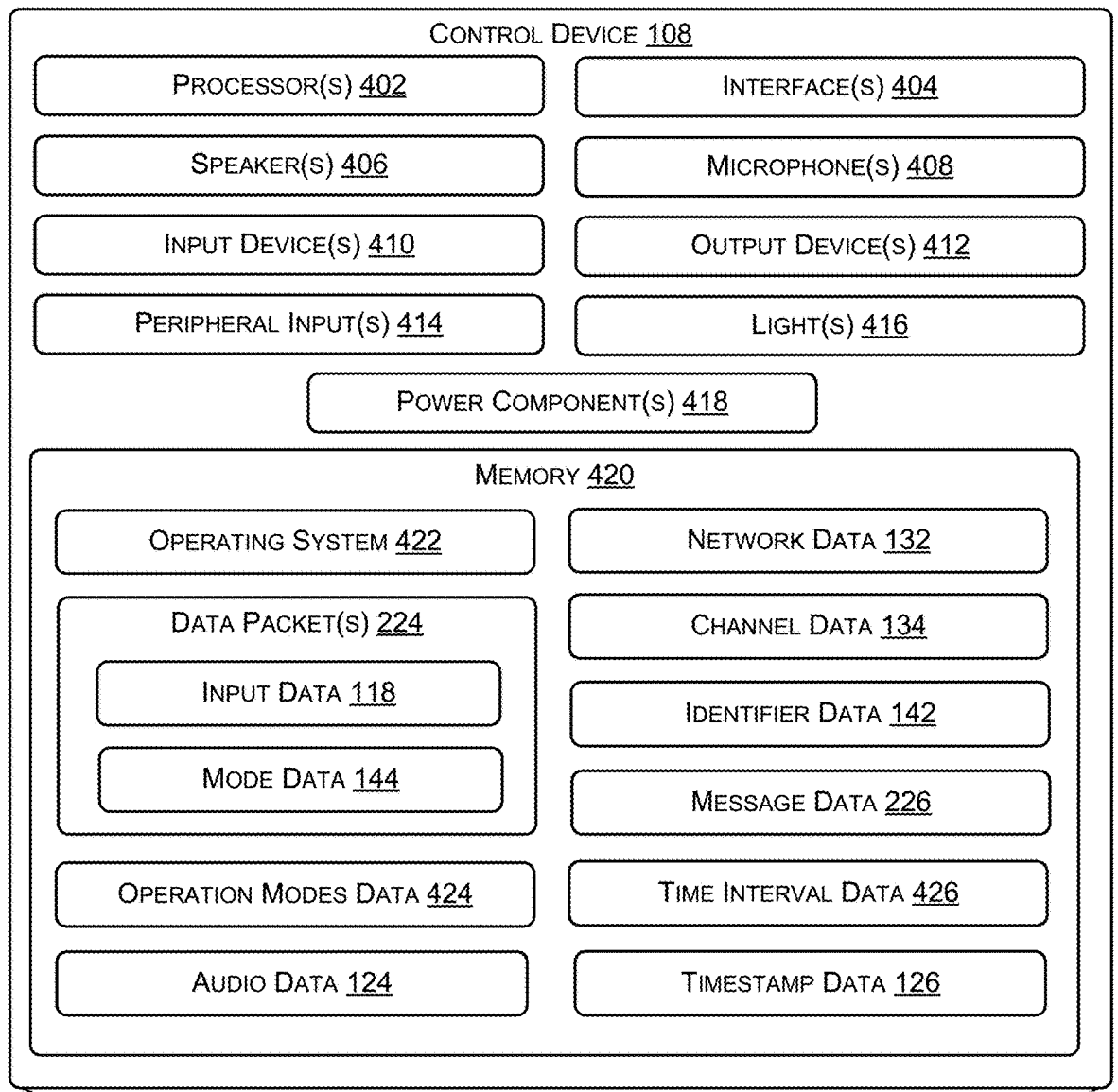
FIG. 4 illustrates a block diagram of an example architecture of a control device, according to various examples of the present disclosure.
Figure 4:
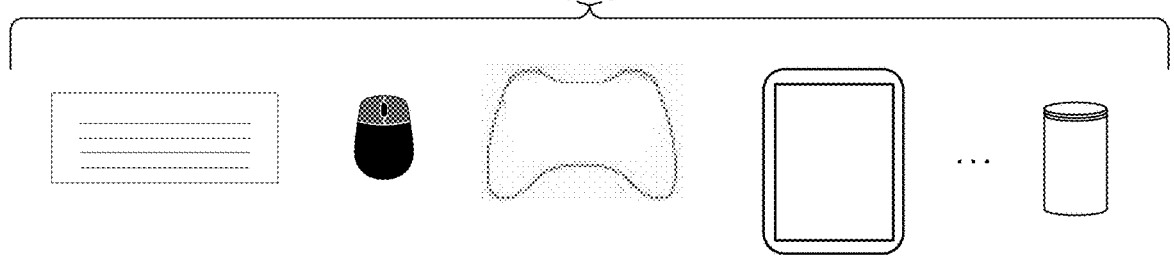

FIG. 4 illustrates a block diagram of an example architecture of the control device 108, according to various examples of the present disclosure. As shown, the control device 108 includes processor(s) 402, network interface(s) 404, speakers 406, microphone(s) 408, input device(s) 410, output device(s) 412, peripheral input(s) 414, light(s) 416, power component(s) 418, and memory 420. In some instances, the control device 108 may include one or more additional components not illustrated in the example of FIG. 4. In some instances, the control device 108 may not include one or more of the speaker(s) 406, the microphone(s) 408, the input device(s) 410, the output device(s) 412, the light(s) 416, or the peripheral input(s) 414.

Although the control device 108 is illustrated as having one or more integral speaker(s) 406, in other examples, the control device 108 may not include speaker(s) 406. For example, the control device 108 may produce an audio output signal that drives an external loudspeaker, such as headphones connected to the control device 108 via a peripheral input 414. As another example, the control device 108 may drive or control an external loudspeaker through a wireless data connection such as a Bluetooth connection. In other situations, the control device 108 may be used in conjunction with a loudspeaker device that receives audio data and other instructions from the remote system 104 and/or the electronic device 102, rather than from the control device 108.

The microphone(s) 408 may include sensors (e.g., transducers) configured to receive sound. The microphone(s) 408 may generate input signals for audio input (e.g., sound). For example, the microphone(s) 408 may determine digital input signals for an utterance of a user. In some instances, the microphone(s) 408 are implemented in an array. The array may be arranged in a geometric pattern, such as a linear geometric form, circular geometric form, or any other configuration. For example, for a given point, an array of four sensors may be placed in a circular pattern at 90 degree increments (e.g., 0, 90, 180, 270) to receive sound from four directions. The microphone(s) 408 may be in a planar configuration, or positioned apart in a non-planar three-dimensional region. In some instances, the microphone(s) 408 may include a spatially disparate array of sensors in data communication. For example, a networked array of sensors may be included. The microphone(s) 408 may include omni-directional microphones, directional microphones (e.g., shotgun microphones), and so on.

In some instances, the microphone(s) 408 and the speaker(s) 406 facilitate interactions, such as dialogue, with a user. The microphone(s) 408 produce audio data representing sound from the environment of the control device 108, such speech utterances by the user. The audio data produced by the microphone(s) 408 may comprise directional audio signals or may be used to produce directional audio signals, where each of the directional audio signals emphasizes audio from a different radial direction relative to the microphone(s) 408.

The input device(s) 410 may include button(s), key(s), joystick(s), touch-sensitive pad(s), trigger(s), sensor(s) that detect movement of the control device 108 (e.g., accelerometer(s), magnetometer(s), etc.), and/or any other type of device that is able to receive input from the user. The output device(s) 412 may include devices that provide feedback to the user. For instance, the output device(s) 412 may include haptic driver(s) that cause actuator(s) to activate.

The power component(s) 418 may be configured to provide power to the control device 108. For a first example, the power component(s) 418 may include one or more batteries. In some instances, the one or more batteries may be rechargeable. For a second example, the power component(s) 418 may include components connected to a source of external AC (alternating-current) power, such as a household AC power supply (alternatively referred to herein as "AC mains" or "wall power").

The light(s) 416 may include visual indicator(s) (e.g., light-emitting diodes (LEDs)) that emit light when activated by the control device 108. In some instances, the visual indicator(s) may include a light ring disposed on a portion of the control device 108. In other instances, the visual indicator(s) may be disposed on various portions on the control device 108. The peripheral input(s) 414 may include one or more components for connecting peripheral devices to the control device 108. For instance, a peripheral input 414 may include a jack for connecting headphones to the control device 108.

The control device 108 may include memory 420. The memory 420 may be used to store any number of software components that are executable by the processor(s) 402. Software components stored in the memory 420 may include an operating system 422 that is configured to manage hardware and services within and coupled to the control device 108. In addition, the memory may store the data packet(s) 224 generated by the control device 108, which are then sent to the electronic device 102. The memory 420 may further store the network data 132, the channel data 134, the identifier data 142, and/or the message data 226.

In the example of FIG. 4, the memory 420 further stores operating modes data 424 representing the different modes of the control device 108. For a first example, the operating modes data 424 may indicate that, when the control device 108 is operating in the first mode, the control device 108 is to provide power to one or more of the components 402-416 and, when the control device 108 is operating in the second mode, the control device 108 is to cease providing at least a portion of the power to one or more of the components 402-416.

Additionally, or alternatively, and for a second example, the operating modes data 424 may represent other modes, such as (1) a mode of operation where the control device 108 is actively listening for data, receiving data, and sending data, (2) a mode of operation where the control device 108 is able to quickly switch to the first mode of operation (e.g., the radio is off and the radio processor is halted, but baseband phase-locked loop (PLL), crystal are still active), (3) a mode of operation where the control device 108 maintains an association with the electronic device 102, but sleeps between beacons, (4) a mode of operation where a system on chip (SoC) completes powering down part of the control device 108 for minimal leakage of device hibernation, and/or the like. While these are just a couple of examples of modes represented by the operation modes data 424, in other examples, the operation modes data 424 may represent one or more additional modes of operation.

In some instances, the memory 420 may further store time interval data 426. The time interval data 426 may indicate the given time intervals for sending the data packet(s) 224 to the electronic device 102. For example, the time interval data 426 may indicate that the control device 108 is to send the data packet(s) 224 every five milliseconds, eight milliseconds, ten milliseconds, one hundred milliseconds, and/or the like. In some instances, the time intervals may be updated based at least in part on one or more factors. The one or more factors may include, but are not limited to, the mode of operation of the control device 108, the current power level of the power component(s) 418, the one or more conditions represented by the network data 132, and/or the like.

In some instances, the network interface(s) 404 may include at least a first network interface 204 for communicating over the first type of network and a second network interface 404 for communicating over the second type of network. Additionally, in some instances, the network interface(s) 404 may include a first network interface 404 for communicating over a first communication channel, a second network interface 404 for communicating over a second communication channel, a third network interface 404 for communicating over a third communication channel, and/or so forth.

Figure 5:
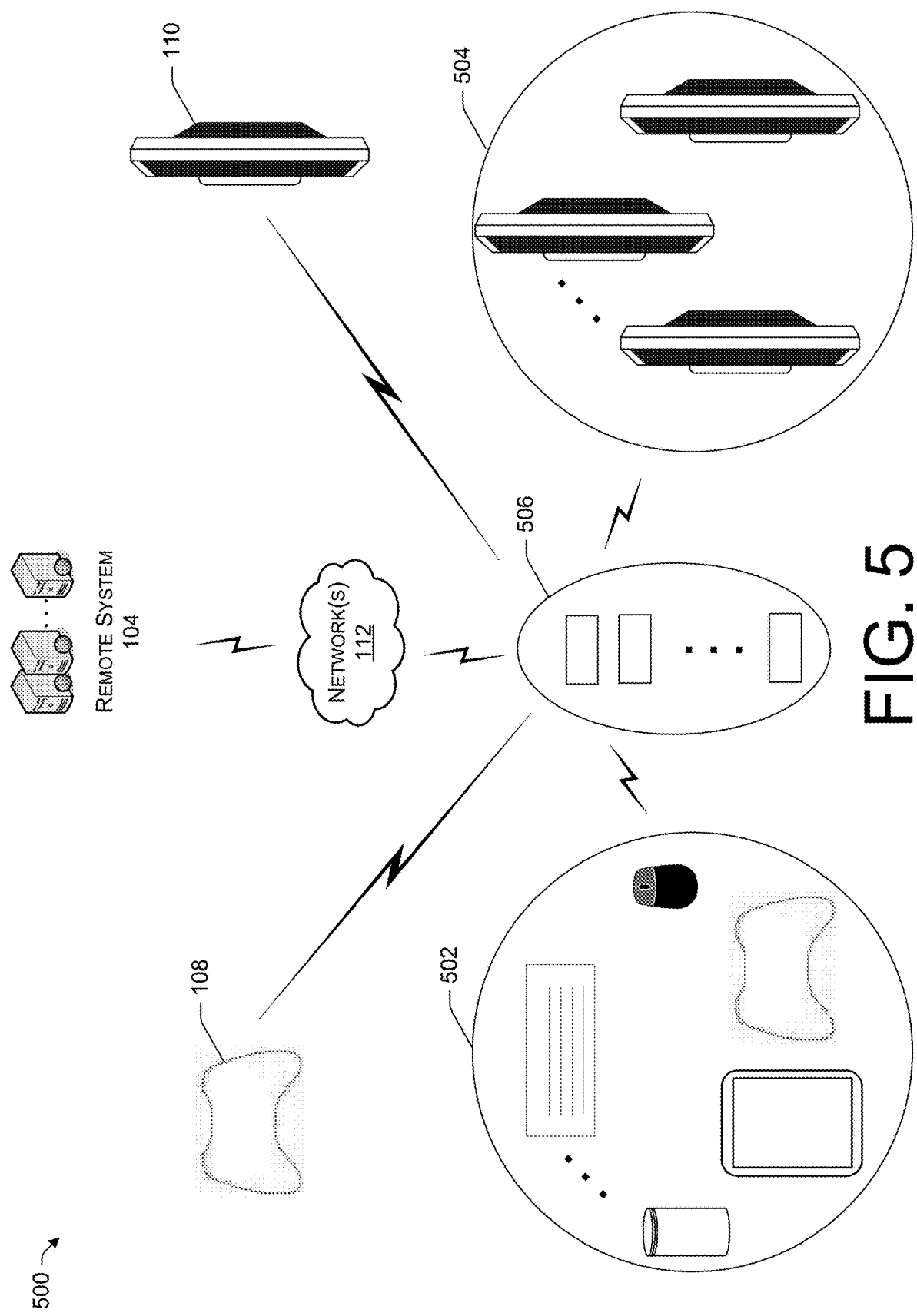
FIG. 5 illustrates a schematic diagram of an example system for communicating with multiple control devices and/or display devices in a network, according to various examples of the present disclosure.

FIG. 5 illustrates a schematic diagram of an example system 500 for communicating with multiple control devices and display devices in a network, according to various examples of the present disclosure. The system 500 may include, for example, the control device 108, the remote system 104, the display device 110, additional control device(s) 502 (which may be similar to the control device 108), additional display device(s) 504 (which may be similar to the display device 110), and electronic devices(s) 506 (which include the electronic device 102). In the example of FIG. 5, the control device 108 and one or more of the additional control device(s) 502 may be controlling an application provided by the remote system 104.

For example, the remote system 104 may receive, over the network(s) 112, input data from the control device 108 and the one or more additional control device(s) 502 via one or more of the electronic device(s) 506. The remote system 104 may then update, using the input data, a state of an application. Additionally, the remote system 104 may send, to the one or more electronic device(s) 506, video data, audio data, and/or timestamp data that represents the state of the application. The audio data and/or the timestamp data may include first audio data and first timestamp data associated with the control device 108, second audio data and second timestamp data associated with a first additional control device 502, third audio data and third timestamp data associated with a second additional control device 502, and/or so forth. The one or more electronic device(s) 506 may then send the audio data and the timestamp data to the control device 108 and the one or more additional control device(s) 502.

Additionally, the video data and/or the timestamp data may include first video data and first timestamp data associated with the display device 110, second video data and second timestamp data associated with a first additional display device 504, third video data and third timestamp data associated with a second additional display device 504, and/or so forth. The one or more electronic device(s) 506 may then send the video data and the timestamp data to the display device 110 and/or the one or more additional display device(s) 504.

In some instances, individual electronic devices of the one or more electronic device(s) 506 may be performing the processes described herein to synchronize the outputting of the sound by the control device 108 and/or the one or more additional control device(s) 502 with the displaying of the image(s) by the display device 110 and/or the one or more additional display device(s) 504. Additionally, individual electronic devices of the one or more electronic device(s) 506 may be performing the processes described herein to cause the control device 108 and/or the one or more additional control device(s) 502 to switch between at least a first mode of operation and a second mode of operation.

In some instances, a single electronic device 506 may be sending data to and/or receiving data from the control device 108 as well as one or more of the additional control devices 502. In some instances, a single electronic device 506 may be sending data to and/or receiving data from the display device 110 as well as one or more additional display devices 504. In some instances, an individual electronic device 506 may be sending data to and/or receiving data from the control device 108 or one of the additional control devices 502. Still, in some instances, an individual electronic device 506 may be sending data to and/or receiving data from the display device 110 or one of the additional display devices 504. In other words, any number of the electronic device(s) 506 may be used with any number of the control device(s) 108 and 502 and/or any number of the display device(s) 110 and 504.

In some instances, such as when a user associated with the control device 108 is playing a network application, such as a network gaming application, one or more of the additional control device(s) 502, one or more of the additional display device(s) 504, and one or more of the electronic device(s) 506 may be located remotely from the user. However, the one or more additional control device(s) 502, the one or more additional display device(s) 504, the one or more electronic device(s) 506, and the remote system 104 may perform the techniques described herein to update the state of the application for all of the users.

For example, such as when the application includes a gaming application, the remote system 104 may store an authoritative version of the environment of the game. The remote system 104 may then use the input data from the control devices 108 and 502 to update the positions of objects (e.g., characters, vehicles, buildings, etc.) within the environment. As such, the data representing a local state of the application that is associated with a control device, such as the control device 108, may represent the position(s) of object(s) that are controlled by the control device. The remote system 104 sends this data to the electronic device(s) 506 that are associated with the control device.

For example, a first local state of the application associated with the control device 108 may be different than a second local state of the application associated with an additional control device 502. For example, such as during a multiplayer network game, the first local state of the application associated with the control device 108 may represent a first position of a first object within a gaming environment, where the control device 108 is configured to control the first object. As such, the display device 110 may be displaying image(s) that represent the first local state of the application. Additionally, one of the electronic device(s) 506 may be synchronizing the outputting of the sound by the control device 108 with the displaying of the image(s) by the display device 110.

Furthermore, the second local state of the application associated with the additional control device 502 may represent a second position of a second object within the gaming environment, where the additional control device 502 is configured to control the second object. As such, an additional display device 504 (and/or the display device 110) may be displaying image(s) that represent the second local state of the application. Moreover, one of the electronic device(s) 506 may be synchronizing the outputting of the sound by the additional control device 502 with the displaying of the image(s) by the additional display device 504 (and/or the display device 110).

In such instances, when the remote system 104 updates the second local state of the application associated with the additional control device 502, such as by changing the position of the second object within the gaming environment, the remote system 104 may further update the first local state of the application to include the updated position of the second object. As such, the first local state of the application may represent both the first position of the first object and the updated position of the second object.

As discussed above, in some instances, the control device 108 may be associated with both the display device 110 and one or more of the additional display devices 504. For example, as the remote system 104 is receiving the input data from the control device 108 and updating the state of the application using the input data, the remote system 104 may be sending, over the network(s) 112, data (e.g., video data, audio data, timestamp data, etc.) to the display device 110 and at least one additional display device 504 via at least one of the electronic device(s) 506. In some instances, the data sent to the display device 110 may be the same as the data that is sent to the additional display device 504. For example, the display device 110 and the additional display device 504 may be displaying similar content (e.g., image(s) representing the state of the application). Additionally, the display device 110 and the additional display device 504 may be receiving similar timestamp data that causes the display device 110 and the additional display device 504 to synchronize displaying of the content.

In some instances, the data sent to the display device 110 may be different than the data that is sent to the additional display device 504. For example, the display device 110 and the additional display device 504 may operate as a "split-screen" where the display device 110 displays a first portion of the content and the additional display device 504 displays a second portion of the content. Additionally, the display device 110 and the additional display device 504 may be receiving different timestamp data that causes the display device 110 and the additional display device 504 to synchronize displaying of the content.

In some instances, the control device 108 and one or more of the additional control device(s) 502 may be associated with the display device 110. For example, a first user may be using the control device 108 to control the application while a second user is using an additional control device 502 to control the application. For instance, the remote system 104 may be receiving, over the network(s) 112 and from one or more of the electronic device(s) 506, data (e.g., input data) from each of the control device 108 and the additional control device 502. The remote system 104 may then update the state of the application using the data that is received from each of the control device 108 and the additional control device 502. Additionally, the remote system 104 may be sending, over the network(s) 112, data (e.g., video data, audio data, timestamp data, etc.) to the display device 110 via the one or more electronic device(s) 506, where the data represents the current state of the application.

In some instances, and in each of the examples described above, the control device 108 and one or more of the additional control devices 502 may be located in the same environment and/or the display device 110 and/or one or more of the additional display devices 504 may be located in the same environment. In some instances, and in each of the examples described above, the control device 108 and one or more of the additional control devices 502 may be located in separate environments and/or the display device 110 and/or one or more of the additional display devices 504 may be located in separate environments.

In some instances, when an electronic device 506 is synchronizing the outputting of audio by the control device 108 with one or more additional control devices 502, the electronic device 506 may perform the processes described above and/or one or more additional processes. For instance, the electronic device 506 may partition the given time intervals by determining first time(s) for sending first data to the display device 110, second time(s) for sending second data to the control device 102, third time(s) for sending third data to an additional control device 502, and/or so forth. For example, if the given time intervals are eight milliseconds, the electronic device 506 may determine to send the first data to the display device 110 between the first millisecond and the fourth millisecond of the given time intervals, determine to send the second data to the control device 102 between the fourth millisecond and the sixth millisecond of the given time intervals, and determine to send the third data to the additional control device 502 between the sixth millisecond and the eighth millisecond of the given time intervals.

Additionally, or alternatively, in some instances, the electronic device 506 may use a first given time interval for the control device 102, use a second given time interval for the additional control device 502, and/or so forth. For example, the electronic device 506 may use eight millisecond time intervals for the control device 108, where the eight millisecond time intervals start at zero milliseconds, eight milliseconds, sixteen milliseconds, and/or so forth. Additionally, the electronic device 506 may use eight millisecond time intervals for the other control device 502, where the eight millisecond time intervals start at four milliseconds, twelve milliseconds, twenty milliseconds, and/or so forth.

Additionally, or alternatively, in some instances, the electronic device 506 may decrease and/or increase the give time intervals. In such instances, the electronic device 506 may increase or decrease the given time intervals based at least in part on one or more factors. The one or more factors may include, but are not limited to, PER(s) for the control device 102 and/or the other control device(s) 502, RSSI(s) for the control device 102 and/or the other control device(s) 502, bit rate error(s) for the control device 102 and/or the other control device(s) 502, a wireless channel availability, number(s) of consecutive packet losses for the control device 102 and/or the other control device(s) 502, packet outage duration(s) for the control device 102 and/or the other control device(s) 502, packet arrival time(s) for the control device 102 and/or the other control device(s) 502, a number of control devices, and/or the like.

For example, the electronic device 506 may originally use a given time interval of eight milliseconds when performing the synchronization. However, based at least in part on one or more of the factors, the electronic device 506 may determine to use a new given time interval of sixteen milliseconds for the synchronization. In some instances, the electronic device 506 may determine new given time intervals every millisecond, second, five seconds, and/or another time period.

FIG. 6 illustrates a schematic diagram of an example system that includes the electronic device 102 sending messages to other devices, according to various examples of the present disclosure. For example, the electronic device 102 may receive message data 226 from the remote system 104, where the message data 226 represents a message for a user of the control device 108. For a first example, the message may include a request for the user to participate in a multiplayer game. For a second example, the message may notify the user that an update is available for a network application. Still, for a third example, the message may include an alert about an upcoming event. While these are just a couple of example messages that may be received by the electronic device 102, in other examples, the electronic device 102 may receive any kind of message.

The electronic device 102 may then send the message to one or more other devices. For a first example, the electronic device 102 may send, to the control device 108, data that includes an instruction to perform a function. The function may include, but is not limited to, outputting sound representing the message, activating one or more lights, and/or the like. For a second example, the electronic device 102 may send, to the display device 110, data that causes the display device 110 to display the message.

For a third example, the electronic device 102 may send, to a user device 602, data that causes the user device 110 to output the message to the user. The user device 602 may include, but is not limited to, a mobile phone, a computer, a laptop, a tablet, and/or any other type of device. Outputting the message to the user may include the user device 602 displaying the message to the user and/or the user device 602 outputting sound that represents the message to the user. Still, for a fourth example, the electronic device 102 may send, to a voice-controlled device 604, data representing the message. The voice-controlled device 604 may then output sound that represents the message.

In some instances, the electronic device 102 may send the data to the control device 108, the display device 110, the user device 602, and/or the voice-controlled device 604 using the first type of network. In some instances, the electronic device 102 may send the data to the control device 108, the display device 110, the user device 602, and/or the voice-controlled device 604 using the second type of network.

FIGS. 7A-12 illustrate various processes for using a system to execute a network application. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed.

Figure 7A:
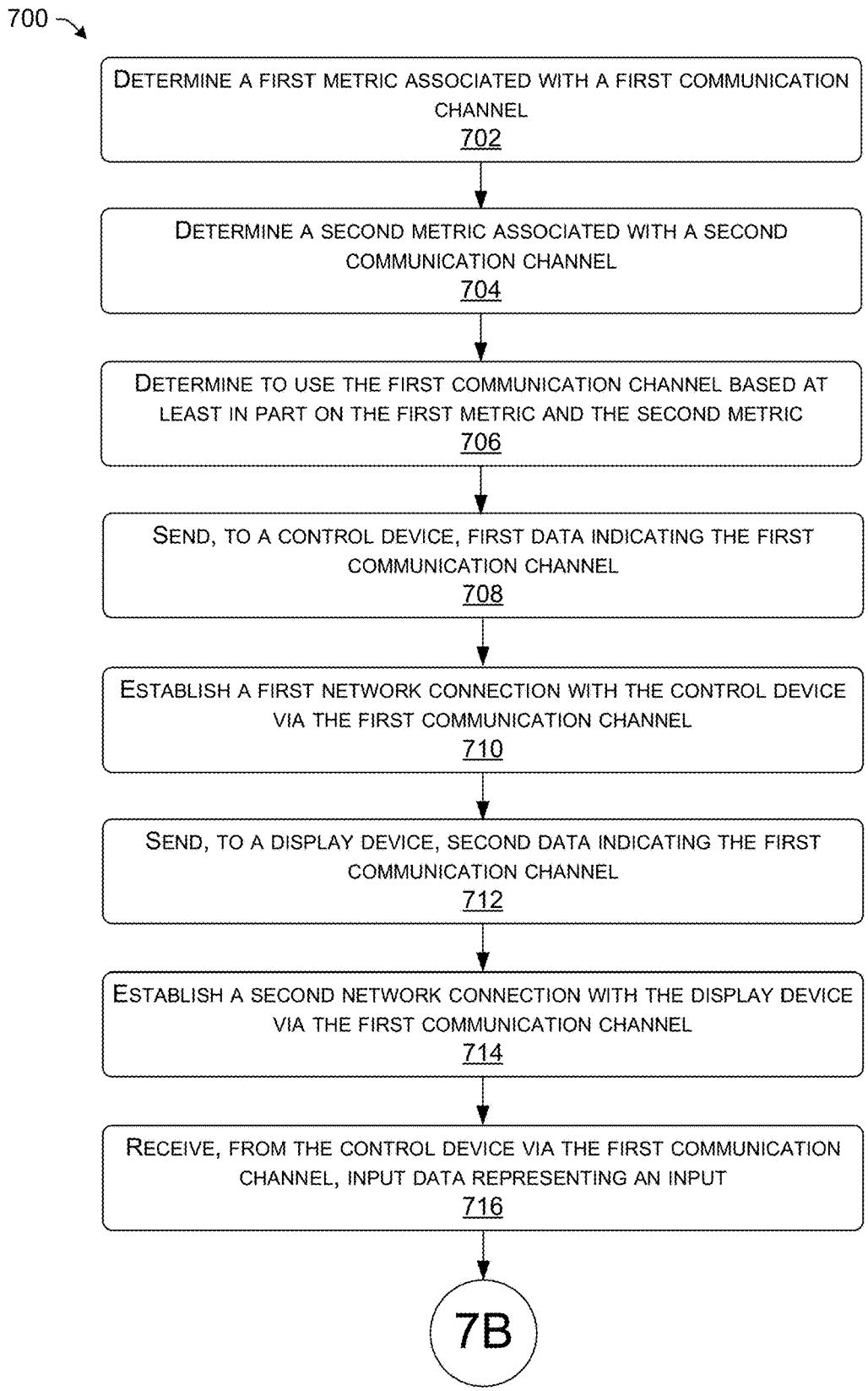
FIGS. 7A-7B illustrate an example process for using an electronic device to execute a network application, according to various examples of the present disclosure.
Figure 7B:
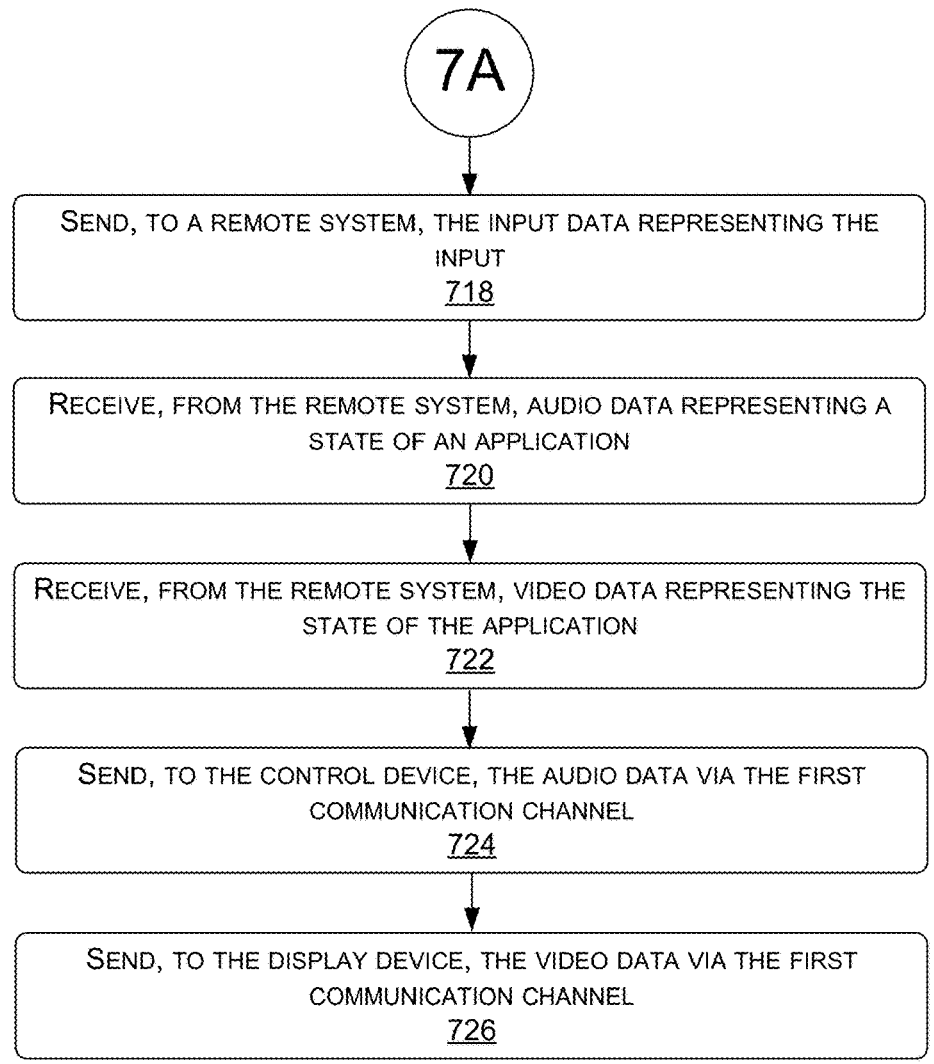

FIGS. 7A-7B illustrate an example process 700 for using the electronic device 102 to execute a network application, according to various examples of the present disclosure. At 702, the process 700 may include determining a first metric associated with a first communication channel and at 704, the process 700 may include determining a second metric associated with a second communication channel. For instance, the electronic device 102 may scan the spectrum of communication channels in order to determine the first metric associated with the first communication channel and the second metric associated with the second communication channel. In some instances, the electronic device 102 scans the spectrum using a first network interface that communicates using a first type of network.

At 706, the process 700 may include determining to use the first communication channel based at least in part on the first metric and the second metric. For instance, the electronic device 102 may determine to use the first communication channel. In some instances, the electronic device 102 makes the determination by selecting the first communication channel using the first metric and the second metric. In some instances, the electronic device 102 makes the determination by sending, via a wired connection, data to the network device 106 for sending to the remote system 104, wherein the data indicates the first metric and the second metric. The electronic device 102 then receives, via the wired connection and from the network device 106, data indicating the first communication channel. Still, in some instances, the electronic device 102 selects more than one communication channel.

At 708, the process 700 may include sending, to a control device, first data indicating the first communication channel and at 710, the process 700 may include establishing a first network connection with the control device via the first communication channel. For instance, the electronic device 102 may send, to the control device 108, the first data indicating the first communication channel. In some instances, the electronic device 102 sends the first data using the first type of network (e.g., using the first network interface). In some instances, the electronic device 102 sends the first data using a second type of network (e.g., using a second network interface). In either instance, the electronic device 102 may then establish the first network connection with the control device 108 via the first communication channel.

At 712, the process 700 may include sending, to a display device, second data indicating the first communication channel and at 714, the process 700 may include establishing a second network connection with the display device via the first communication channel. For instance, the electronic device 102 may send, to the display device 110, the second data indicating the first communication channel. In some instances, the electronic device 102 sends the second data using the first type of network (e.g., using the first network interface). In some instances, the electronic device 102 sends the second data using the second type of network (e.g., using the second network interface). In either instance, the electronic device 102 may then establish the second network connection with the display device 110 via the first communication channel.

At 716, the process 700 may include receiving, from the control device via the first communication channel, input data representing an input. For instance, the electronic device 102 may receive, from the control device 108 via the first communication channel, the input data. The input data may represent the input received by the control device 108 via one or more input devices. The input may be associated with updating a state of an application executing on the remote system 104.

At 718, the process 700 may include sending, to a remote system, the input data representing the input. For instance, the electronic device 102 may send, via the wired connection, the input data to the network device 106 for sending to the remote system 104. The remote system 104 may then use the input data to update a state of the application. For instance, the remote system 104 may use the input data to update a location of an object within a gaming environment.

At 720, the process 700 may include receiving, from the remote system, audio data representing a state of an application and at 722, the process 700 may include receiving, from the remote system, video data representing the state of the application. For instance, the electronic device 102 may receive, via the wired connection, the audio data and the video data from the network device 106, which receives the audio data and the video data from the remote system 104. In some instances, the electronic device 102 may further receive, via the wired connection, first timestamp data associated with the audio data and/or second timestamp data associated with the video data. In some instances, the electronic device 102 may receive a data packet that includes the audio data, the video data, the first timestamp data, and/or the second timestamp data.

At 724, the process 700 may include sending, to the control device, the audio data via the first communication channel. For instance, the electronic device 102 may send the audio data to the control device 108 via the first communication channel. In some instances, the electronic device 102 may further send the first timestamp data to the control device 108 via the first communication channel. In some instances, the electronic device 102 may send the audio data after determining that a current time includes a first time represented by the first timestamp data and/or that the current time is within a threshold period of time to the first time represented by the first timestamp data.

At 726, the process 700 may include sending, to the display device, the video data via the first communication channel. For instance, the electronic device 102 may send the video data to the display device 110 via the first communication channel. In some instances, the electronic device 102 may further send the second timestamp data to the display device 110 via the first communication channel. In some instances, the electronic device 102 may send the video data after determining that a current time includes a second time represented by the second timestamp data and/or that the current time is within a threshold period of time to the second time represented by the second timestamp data.

It should be noted that, in some instances, such as when the electronic device 102 determines more than one communication channel, the second data may indicate a different communication other than the first communication channel. In such instances, the electronic device 102 may then establish the second network connection with the display device 110 via the different communication channel. Additionally, the electronic device 102 may send the video data and/or the second timestamp data to the display device 110 via the different communication channel.

Figure 8:
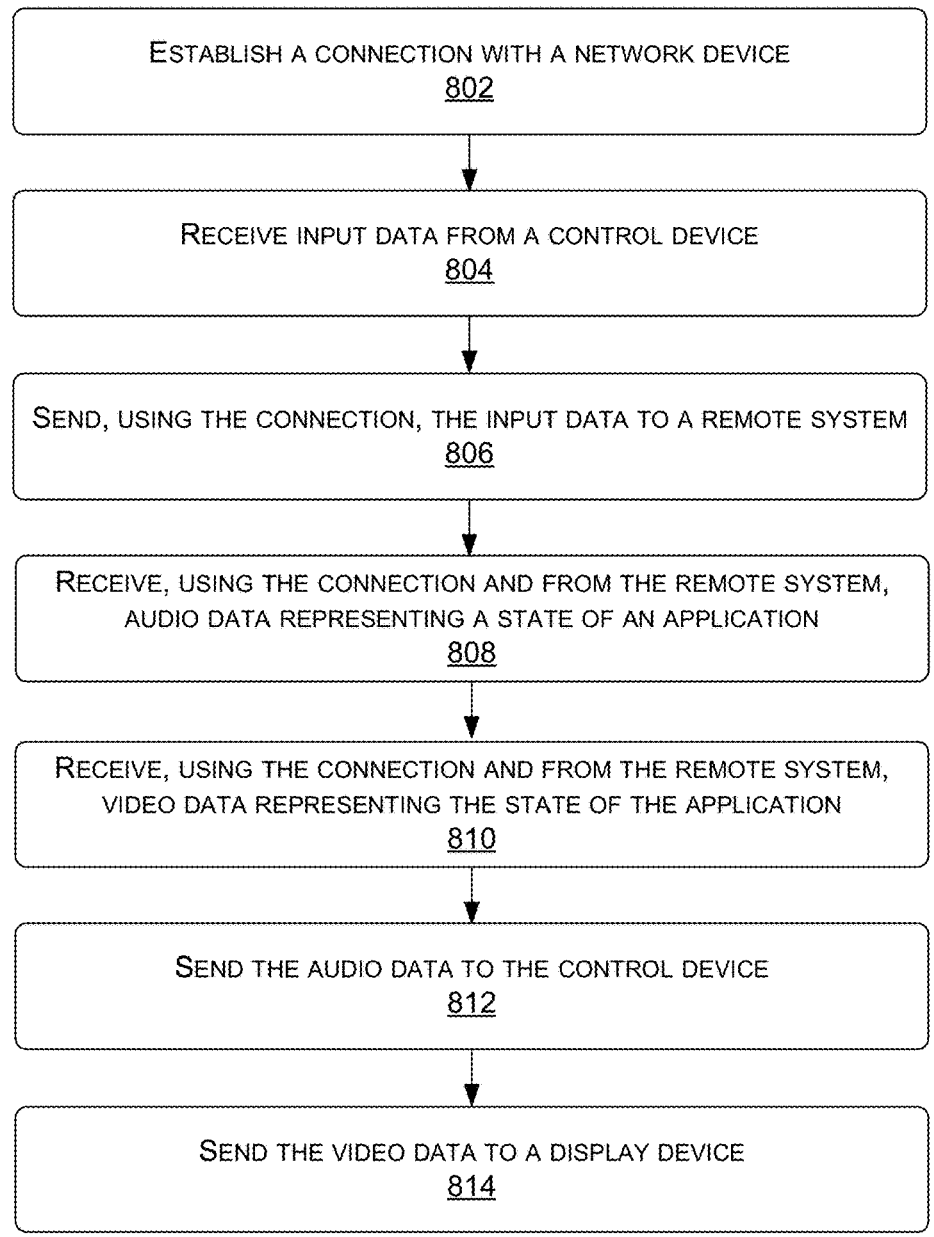
FIG. 8 illustrates another example process of using an electronic device to execute a network application, according to various examples of the present disclosure.

FIG. 8 illustrates another example process 800 of using the electronic device 102 to execute a network application, according to various examples of the present disclosure. At 802, the process 800 may include establishing a connection with a network device. For instance, the electronic device 102 may establish the connection with the network device 106. In some instances, the connection includes a wired connection, such as an Ethernet connection. In some instances, the connection includes a wireless connection.

At 804, the process 800 may include receiving input data from a control device and at 806, the process 800 may include sending, using the connection, the input data to the remote system. For instance, the electronic device 102 may receive the input data from the control device 108, where the input data represents input(s) received by the control device 108. In some instances, the input(s) may be associated with updating a state of an application. The electronic device 102 may then send, using the connection, the input data to the remote system 104. The remote system 104 may the update the state of the application using the input data.

At 808, the process 800 may include receiving, using the connection and from the remote system, audio data representing a state of an application. For instance, after sending the input data, the electronic device 102 may receive, using the connection, the audio data from the remote system 104. The audio data may represent sound associated with the state of the application. In some instances, the electronic device 102 may further receive first timestamp data representing a first time for outputting the sound.

At 810, the process 800 may include receiving, using the connection and from the remote system, video data representing the state of the application. For instance, after sending the input data, the electronic device 102 may receive, using the connection, the video data from the remote system 104. The video data may represent image(s) associated with the state of the application. In some instances, the electronic device 102 may further receive second timestamp data representing a second time for outputting the image(s).

At 812, the process 800 may include sending the audio data to the control device. For instance, the electronic device 102 may send the audio data to the control device 108. In some instances, the electronic device 102 may also send the first timestamp data to the control device 108. In some instances, the electronic device 102 may send the audio data after determining that a current time includes the first time and/or that the current time is within a threshold period of time to the first time.

At 814, the process 800 may include sending the video data to a display device. For instance, the electronic device 102 may send the video data to the display device 110. In some instances, the electronic device 102 may also send the second timestamp data to the display device 110. In some instances, the electronic device 102 may send the video data after determining that the current time includes the second time and/or that the current time is within a threshold period of time to the second time.

Figure 9:
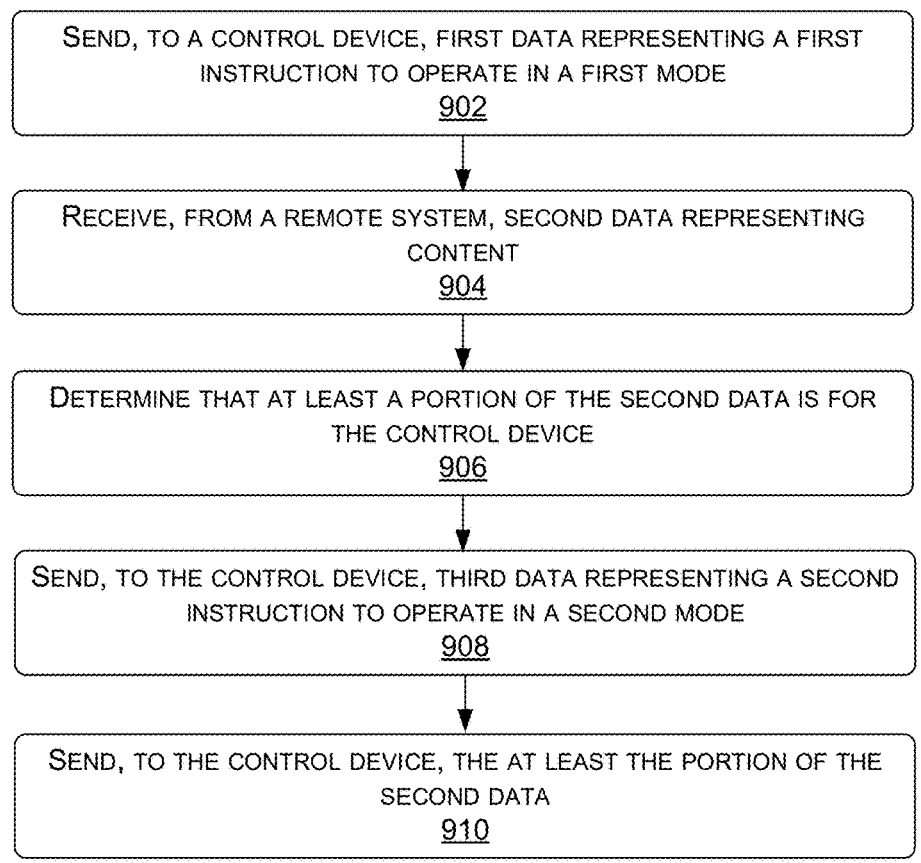
FIG. 9 illustrates an example process of an electronic device causing a control device to operate in different modes of operation, according to various examples of the present disclosure.

FIG. 9 illustrates an example process 900 of the electronic device 102 causing the control device 108 to operate in different modes of operation, according to various examples of the present disclosure. At 902, the process 900 may include sending, to a control device, first data representing an instruction to operate in a first mode. For instance, the electronic device 102 may send, to the control device 108, the first data representing the first instruction to operate in the first mode. In some instances, the electronic device 102 sends the first data using a first type of network. In some instances, the electronic device 102 sends the first data based at least in part on determining that the electronic device 102 does not have additional data to send to the control device 108.

At 904, the process 900 may include receiving, from a remote system, second data representing content and at 906, the process 900 may include determining that at least a portion of the second data is for the control device. For instance, the electronic device 102 may receive the second data from the remote system 104. The second data may include, but is not limited to, audio data, video data, timestamp data, and/or identifier data. The electronic device 102 may then determine that the at least the portion of the second data is for the control device 108. In some instances, the electronic device 102 makes the determination based at least in part on the second data including the audio data, where the control device 108 is configured to output the audio data. In some instances, the electronic device 102 makes the determination based at least in part on the second data representing an identifier associated with the control device 108.

At 908, the process 900 may include sending, to the control device, third data representing an instruction to operate in a second mode. For instance, the electronic device 102 may send, to the control device 108, the third data representing the second instruction to operate in the second mode. In some instances, the electronic device 102 sends the third data using the first type of network. In some instances, the electronic device 102 sends the third data based at least in part on determining that the electronic device 102 is storing the at least the portion of the second data that is directed to the control device 108.

At 910, the process 900 may include sending, to the control device, the at least the portion of the second data. For instance, after sending the third data, the electronic device 102 may send the at least the portion of the second data (e.g., the audio data, the timestamp data, etc.) to the control device 108. In some instances, the electronic device 102 sends the at least the portion of the second data using a second type of network. In some instances, after sending the at least the portion of the second data, the electronic device 102 may send, to the control device 108, fourth data representing a third instruction to again operate in the first mode.

Figure 10:
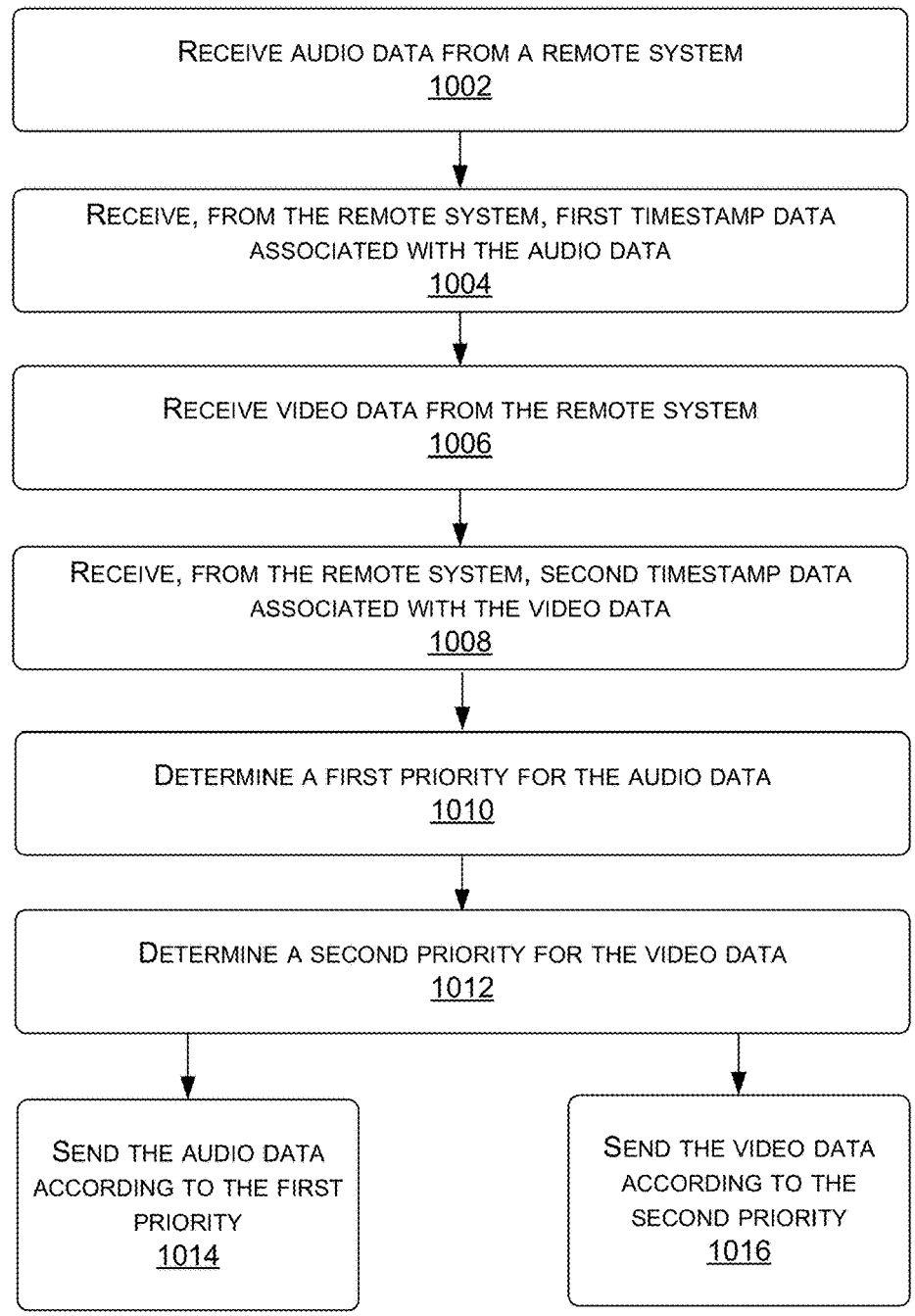
FIG. 10 illustrates an example process of an electronic device prioritizing different types of data, according to various examples of the present disclosure.

FIG. 10 illustrates an example process 1000 of the electronic device 102 prioritizing different types of data, according to various examples of the present disclosure. At 1002, the process 1000 may include receiving audio data from a remote system and at 1004, the process 1000 may include receiving, from the remote system, first timestamp data associated with the audio data. For instance, the electronic device 102 may receive the audio data and the first timestamp data from the remote system 104. The first timestamp data may represent a first time for outputting sound represented by the audio data. In some instances, the audio data is associated with a state of an application.

At 1006, the process 1000 may include receiving video data from the remote system and at 1008, the process 1000 may include receiving, from the remote system, second timestamp data associated with the video data. For instance, the electronic device 102 may receive the video data and the second timestamp data from the remote system 104. The second timestamp data may represent a second time for outputting image(s) represented by the video data. In some instances, the video data is associated with the audio data.

At 1010, the process 1000 may include determining a first priority for the audio data and at 1012, the process 1000 may include determining a second priority for the video data. For instance, the electronic device 102 may determine the first priority for the audio data and the second priority for the video data. In some instances, the electronic device 102 determines the first priority and the second priority using at least the first timestamp data and the second timestamp data. Additionally, or alternatively, in some instances, the electronic device 102 determines the first priority and the second priority by prioritizing the video data over the audio data or prioritizing the audio data over the video data.

At 1014, the process 1000 may include sending the audio data according to the first priority and at 1016, the process 1000 may include sending the video data according to the second priority. For instance, the electronic device 102 may send the audio data to the control device 108 according to the first priority and send the video data to the display device 110 according to the second priority. For a first example, if the first priority is greater than the second priority, then the electronic device 102 may send the audio data to the control device 108 before sending the video data to the display device 110. For a second example, if the second priority is greater than the first priority, then the electronic device 102 may send the video data to the display device 110 before sending the audio data to the control device 108.

Figure 11:
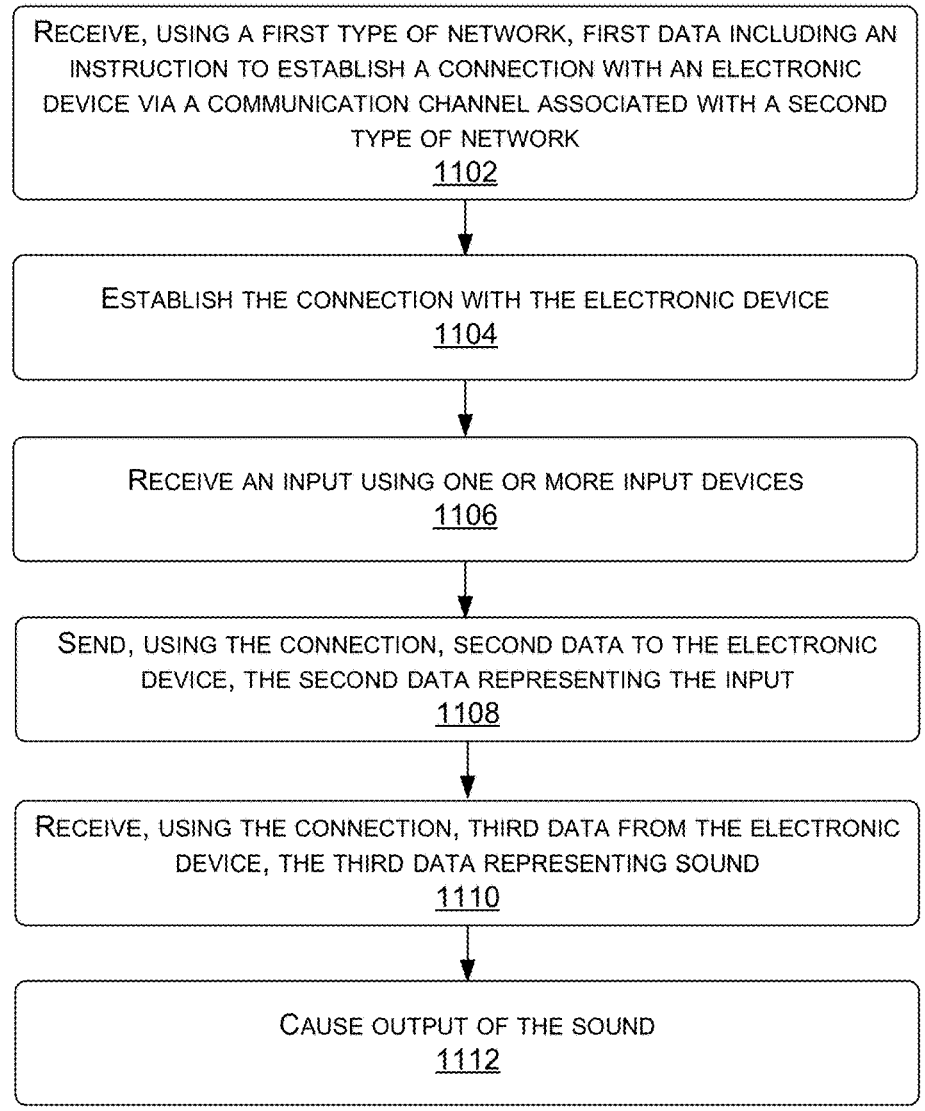
FIG. 11 illustrates an example process of a control device using multiple networks to send and receive data, according to various examples of the present disclosure.

FIG. 11 illustrates an example process 1100 of the control device 108 using multiple networks to send and receive application data, according to various examples of the present disclosure. At 1102, the process 1100 may include receiving, using a first type of network, first data including an instruction to establish a connection with an electronic device via a communication channel associated with a second type of network. For instance, the control device 108 may receive the first data from the electronic device 102. In some instances, the control device 108 receives the first data using a first network interface associated with the first type of network.

At 1104, the process 1100 may include establishing the connection with the electronic device. For instance, based at least in part on receiving the first data, the control device 108 may establish the connection with the electronic device 102. In some instances, the control device 108 establishes the connection using a second network interface associated with the second type of network.

At 1106, the process 1100 may include receiving an input using one or more input devices and at 1108, the process 1100 may include sending, using the connection, second data to the electronic device, the second data representing the input. For instance, the control device 108 may receive the input using the one or more input devices. The input may be associated with updating a state of an application being executed by the remote system 104. After receiving the input, the control device 108 may send, using the connection and to the electronic device 102, the second data representing the input.

At 1110, the process 1100 may include receiving, using the connection, third data from the electronic device, the third data representing sound and at 1112, the process 1100 may include causing output of the sound. For instance, the control device 108 may receive, using the connection, the third data from the electronic device 102. In some instances, the control device 108 may further receive, using the connection, timestamp data from the electronic device 102. The control device 108 may then output the sound. In instances where the control device 108 receives the timestamp data, the control device 108 may use the timestamp data to determine when to output the sound.

Figure 12:
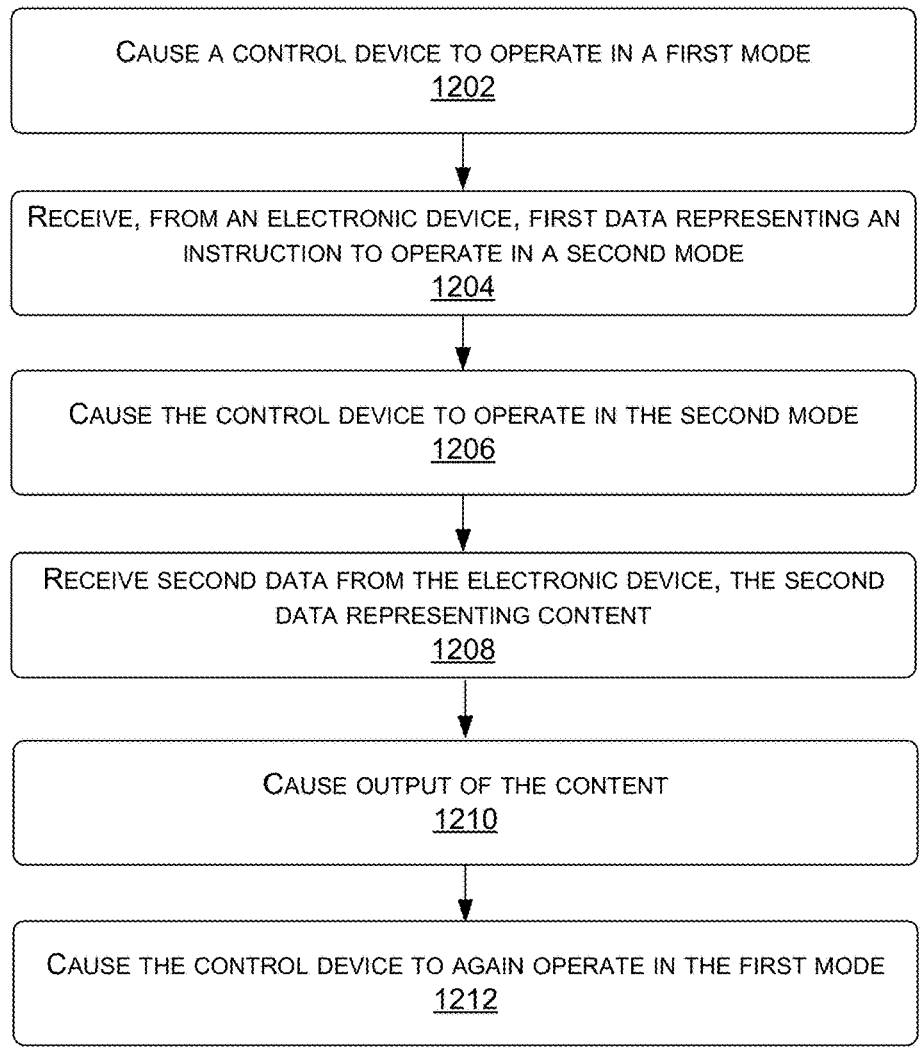
FIG. 12 illustrates an example process of a control device switching between modes of operation based at least in part on data received from an electronic device, according to various examples of the present disclosure.

FIG. 12 illustrates an example process 1200 of the control device 108 switching between modes of operation based at least in part on data received from the electronic device 102, according to various examples of the present disclosure. At 1202, the process 1200 may include causing a control device to operate in a first mode. For instance, the control device 108 may begin operating in the first mode. In some instances, the control device 108 may operate in the first mode by deactivating one or more components of one or more network interfaces. In some instances, the control device 108 may operate in the first mode based at least in part on receiving, from the electronic device 102, data representing an instruction to operate in the first mode.

At 1204, the process 1200 may include receiving, from an electronic device, first data representing an instruction to operate in the second mode and at 1206, the process 1200 may include causing the control device to operate in the second mode. For instance, the control device 108 may receive the first data from the electronic device 102. In some instances, the control device 108 receives the first data using a first type of network. After receiving the first data, the control device 108 begin operating in the second mode. In some instances, the control device 108 may operate in the second mode by activating the one or more components of the one or more network interfaces. In some instances, the control device 108 may use more power operating in the second mode than operating in the first mode.

At 1208, the process 1200 may include receiving second data from the electronic device, the second data representing content and at 1212, the process 1200 may include causing output of the content. For instance, while operating in the second mode, the control device 108 may receive the second data from the electronic device 102. In some instance, the control device 108 receives the second data using a second type of network. The control device 108 may then cause the content to be output. For instance, the control device 108 may cause sound represented by the second data to be output.

At 1214, the process 1200 may include causing the control device to again operate in the first mode. For instance, the control device 108 may again begin operating in the first mode. In some instances, the control device 108 may again operate in the first mode based at least in part on receiving, from the electronic device 102, data representing an additional instruction to operate in the first mode. In some instances, the control device 108 may again operate in the first mode after receiving the second data from the electronic device 102.

While the foregoing invention is described with respect to the specific examples, it is to be understood that the scope of the invention is not limited to these specific examples. Since other modifications and changes varied to fit particular requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. An electronic device comprising:
 a wired connector configured to physically couple to an access point;
 a first network interface configured to communicate over a first network;
 a second network interface configured to communicate over a second network;
 one or more processors; and
 one or more computer-readable media storing instructions that, when executed by the one or more processors, cause the one or more processors to perform operations comprising:
  determining, using the first network interface, first metrics associated with a first communication channel associated with the first network;
  determining, using the first network interface, second metrics associated with a second communication channel associated with the first network;
  selecting the first communication channel based at least in part on the first metrics and the second metrics;
  sending, using the second network interface, first channel data to a game controller, the first channel data indicating the first communication channel;
  establishing, using the first network interface, a first wireless connection with the game controller via the first communication channel;
  sending, using the second network interface, second channel data to a display device, the second channel data indicating the first communication channel;
  establishing, using the first network interface, a second wireless connection with the display device via the first communication channel;
  receiving, using the first network interface, input data from the game controller via the first wireless connection, the input data representing one or more inputs received by the game controller;
  sending, via the wired connector, the input data to the access point for sending to a remote system;
  after sending the input data, receiving, via the wired connector, a data packet from the access point, the data packet including audio data and video data associated with a gaming application;
  sending, using the first network interface, the audio data to the game controller via the first wireless connection; and
  sending, using the first network interface, the video data to the display device via the second wireless connection.

2. The electronic device as recited in claim 1, the operations further comprising:
 sending, using the first network interface, first timestamp data to the game controller via the first wireless connection, the first timestamp data including a first instruction to output sound represented by the audio data at a first time; and
 sending, using the first network interface, second timestamp data to the display device via the second wireless connection, the second timestamp data including a second instruction to display one or more images represented by the video data at a second time, the second time being within a threshold period of time to the first time.

3. The electronic device as recited in claim 1, wherein the audio data is associated with a first state of the gaming application and the video data is associated with the first state of the gaming application, and wherein the operations further comprise:
 receiving, via the wired connection, first timestamp data from the access point, the first timestamp data representing a first output time for outputting sound represented by the audio data;
 determining that a first current time is within a first threshold period of time to the first output time, wherein sending the audio data to the game controller is based at least in part on the first current time being within the first threshold period of time to the first output time;
 receiving, via the wired connection, second timestamp data from the access point, the second timestamp data representing a second output time for displaying one or more images representing by the video data; and
 determining that a second current time is within a second threshold period of time to the second output time, wherein sending the video data to the display device is based at least in part on the second current time being within the second threshold period of time to the second output time.

4. A method comprising:
 establishing a first connection between an electronic device and a network device;
 sending, by the electronic device and using a first type of network, network data to a control device, the network data representing a communication channel;
 establishing, by the electronic device and using a second type of network, a second connection with the control device via the communication channel;
 receiving, by the electronic device and via the second connection, input data from the control device, the input data representing one or more inputs received by the control device;
 sending, by the electronic device and via the first connection, the input data to a remote system;

receiving, by the electronic device and via the first connection, audio data representing a state of an application that is based at least in part on the input data;

receiving, by the electronic device and via the first connection, video data representing the state of the application;

sending, by the electronic device and via the second connection, the audio data to the control device; and sending, by the electronic device, the video data to a display device.

5. The method as recited in claim 4, wherein:

establishing the first connection between the electronic device and the network device comprises establishing a wired connection between the electronic device and the network device;

the method further comprises establishing, using a first network interface of the electronic device, a first wireless connection between the electronic device and the control device, the first wireless connection being associated with the first type of network; and establishing the second connection with the control device comprises establishing, using a second network interface of the electronic device, a second wireless connection between the electronic device and the control device, the second wireless connection being associated with the second type of network.

6. The method as recited in claim 4, further comprising:

receiving, by the electronic device and via the first connection, first timestamp data from the remote system, the first timestamp data indicating a first time for outputting sound represented by the audio data;

receiving, by the electronic device and via the first connection, second timestamp data from the remote system, the second timestamp data indicating a second time for displaying content represented by the video data;

determining, by the electronic device, that a third time is within a first threshold period of time to the first time, wherein sending the audio data to the control device is based at least in part on the third time being within the first threshold time to the first time; and determining, by the electronic device, that a fourth time is within a second threshold period of time to the second time, wherein sending the video data to the display device is based at least in part on the fourth time being within the second threshold time to the second time.

7. The method as recited in claim 4, further comprising:

receiving, by the electronic device and via the first connection, first timestamp data from the remote system, the first timestamp data indicating a first time for outputting sound represented by audio data;

receiving, by the electronic device and via the first connection, second timestamp data from the remote system, the second timestamp data indicating a second time for displaying content represented by the video data;

sending, by the electronic device, the first timestamp data to the control device; and sending, by the electronic device, the second timestamp data to the display device.

8. The method as recited in claim 4, wherein the communication channel is a first communication channel, and wherein the method further comprises:

determining, by the electronic device, a first metric associated with the first communication channel;

determining, by the electronic device, a second metric associated with a second communication channel; and selecting the first communication channel based at least in part on the first metric and the second metric.

9. The method as recited in claim 4, wherein the communication channel is a first communication channel, and wherein the method further comprises:

determining, by the electronic device, a first metric associated with the first communication channel;

determining, by the electronic device, a second metric associated with a second communication channel;

sending, by the electronic device and via the first connection, first data to the remote system, the first data indicating the first metric associated with the first communication channel;

sending, by the electronic device and via the first connection, second data to the remote system, the second data indicating the second metric associated with the second communication channel; and receiving, by the electronic device and via the first connection, third data from the remote system, the third data indicating the first communication channel.

10. The method as recited in claim 4, further comprising:

determining, by the electronic device and using first timestamp data, a first priority associated with outputting sound represented by the audio data;

determining, by the electronic device and using second timestamp data, a second priority associated with displaying content represented by the video data; and determining, by the electronic device, to prioritize one of sending of the audio data or sending of the video data based at least in part on the first priority and the second priority.

11. The method as recited in claim 4, further comprising:

determining, by the electronic device, an identifier associated with communicating over a network with the electronic device;

sending, by the electronic device, first data to the control device, the first data indicating the identifier; and sending, by the electronic device, second data to the display device, the second data indicating the identifier.

12. The method as recited in claim 4, further comprising:

receiving, by the electronic device, first mode data from the control device, the first mode data indicating a first mode associated with the control device;

based at least in part on the first mode data indicating the first mode, refraining from sending, by the electronic device, the audio data to the control device at a first time; and receiving, by the electronic device, second mode data from the control device, the second mode data indicating a second mode associated with the control device, and wherein sending the audio data to the control device comprises, based at least in part on the second mode data indicating the second mode, sending, by the electronic device and via the second connection, the audio data to the control device at a second time.

13. The method as recited in claim 4, further comprising:

sending, by the electronic device, first mode data to the control device, the first mode data indicating a first mode associated with the control device;

based at least in part on the first mode data indicating the first mode, refraining from sending, by the electronic device, the audio data to the control device at a first time; and sending, by the electronic device, second mode data to the control device, the second mode data indicating a second mode associated with the control device, and wherein sending the audio data to the control device comprises, based at least in part on sending the second mode data, sending, by the electronic device and via the second connection, the audio data to the control device at a second time.

14. The method as recited in claim 4, further comprising:

sending, by the electronic device and using the first type of network, first mode data to the control device, the first mode data indicating a first mode associated with the control device;

after sending the first mode data, determining, by the electronic device, that the audio data is associated with the control device; and sending, by the electronic device and using the first type of network, second mode data to the control device, the second mode data indicating a second mode associated with the control device, and wherein sending the audio data to the control device comprises, after sending the second mode data, sending, by the electronic device and via the second connection, the audio data to the control device.

15. The method as recited in claim 4, further comprising:

determining, by the electronic device, at least a characteristic associated with the second connection between the electronic device and the control device;

determining, by the electronic device and using the characteristic, that the control device is able to operate in a mode of operation for a period of time; and sending, by the electronic device, mode data indicating that the control device is able to operate in the mode of operation for the period of time.

16. The method as recited in claim 4, further comprising:

receiving, by the electronic device, additional input data from an additional control device, the additional input data representing one or more additional inputs received by the additional control device;

sending, by the electronic device and via the first connection, the additional input data to the remote system;

receiving, by the electronic device and via the first connection, additional audio data from the remote system, the additional audio data representing an additional state of the application; and sending, by the electronic device, the additional audio data to the additional control device.

17. The method as recited in claim 4, further comprising:

receiving, by the electronic device and via the first connection, request data associated with the application from the remote system; and sending, by the electronic device and to a client device associated with the control device, message data indicating a request to use the control device.

18. An electronic device comprising:
one or more network interfaces;
one or more processors; and
one or more computer-readable media storing instructions that, when executed by the one or more processors, cause the one or more processors to perform operations comprising:

establishing, using the one or more network interfaces, a connection with a network device;

determining a first metric associated with a first communication channel;

determining a second metric associated with a second communication channel;

selecting the first communication channel based at least in part on the first metric and the second metric;

sending, using the one or more network interfaces, network data to a control device, the network data indicating the first communication channel;

receiving, using the one or more network interfaces and via the first communication channel, input data from the control device, the input data representing one or more inputs received by the control device;

sending, using the one or more network interfaces and via the connection, the input data to a remote system;

receiving, using the one or more network interfaces and via the connection, audio data representing a state of an application that is based at least in part on the input data;

receiving, using the one or more network interfaces and via the connection, video data representing the state of the application;

sending, using the one or more network interfaces and via the first communication channel, the audio data to the control device; and sending the video data to a display device.

19. The electronic device as recited in claim 18, wherein:

establishing the connection comprises establishing a wired connection between the electronic device and the network device;

the one or more network interfaces comprises at least a first network interface and a second network interface; and the operations further comprise:

establishing, using the first network interface, a first wireless connection with the control device, the first wireless connection being associated with a first type of network; and establishing, using the second network interface, a second wireless connection with the control device, the second wireless connection being associated with a second type of network and the communication channel.

20. The electronic device as recited in claim 18, the operations further comprising, based at least in part on sending the network data, establishing, using the one or more network interfaces, an additional connection with the control device via the communication channel.

* * * * *